(12) United States Patent
Moorman

(10) Patent No.: US 8,702,548 B2
(45) Date of Patent: Apr. 22, 2014

(54) HYDRAULIC CONTROL SYSTEM FOR AN AUTOMATIC TRANSMISSION

(75) Inventor: Steven P. Moorman, Dexter, MI (US)

(73) Assignee: GM Global Technology Operations

( * ) Notice: Subject to any disclaimer, the term of this patent is extended or adjusted under 35 U.S.C. 154(b) by 293 days.

(21) Appl. No.: 13/288,656

(22) Filed: Nov. 3, 2011

(65) Prior Publication Data

US 2013/0112524 A1 May 9, 2013

(51) Int. Cl.
*F16H 31/00* (2006.01)

(52) U.S. Cl.
USPC ........................................................ 475/116

(58) Field of Classification Search
USPC .............................. 475/116; 192/3.58, 48.607
See application file for complete search history.

(56) References Cited

U.S. PATENT DOCUMENTS

| | | | |
|---|---|---|---|
| 4,653,352 A | 3/1987 | Nakao et al. | |
| 4,944,202 A | 7/1990 | Gierer | |
| 5,441,459 A | 8/1995 | Inukai et al. | |
| 6,715,597 B1 | 4/2004 | Buchanan et al. | |
| 7,300,375 B2 | 11/2007 | Petrzik | |
| 7,487,866 B2 | 2/2009 | Kruse et al. | |
| 2001/0036878 A1 | 11/2001 | Itou et al. | |
| 2002/0060113 A1 | 5/2002 | Harries | |
| 2002/0119864 A1 | 8/2002 | Harries | |
| 2003/0075408 A1 | 4/2003 | Alfredsson | |
| 2004/0038765 A1 | 2/2004 | Fujimine et al. | |
| 2006/0094555 A1* | 5/2006 | Long et al. | 475/116 |
| 2006/0142107 A1* | 6/2006 | Kobayashi et al. | 475/116 |
| 2007/0167267 A1* | 7/2007 | Long et al. | 475/116 |
| 2007/0175726 A1 | 8/2007 | Combes et al. | |
| 2008/0207392 A1 | 8/2008 | Staudinger et al. | |
| 2008/0210032 A1 | 9/2008 | Uberti et al. | |
| 2009/0151495 A1 | 6/2009 | Garabello et al. | |
| 2009/0157271 A1 | 6/2009 | Garabello et al. | |

FOREIGN PATENT DOCUMENTS

| | | |
|---|---|---|
| DE | 2141564 A1 | 2/1973 |
| DE | 4117736 C1 | 5/1992 |
| DE | 4320353 A1 | 1/1994 |
| DE | 29714652 U1 | 10/1997 |
| DE | 19921301 A1 | 11/1999 |
| DE | 19849488 A1 | 5/2000 |
| DE | 19931973 A1 | 1/2001 |
| DE | 10134115 A1 | 1/2003 |
| DE | 10243282 | 4/2004 |
| DE | 102005029963 A1 | 2/2007 |
| DE | 102005029964 A1 | 3/2007 |
| EP | 0477564 A2 | 4/1992 |
| EP | 1469235 A1 | 10/2004 |
| EP | 1519082 A1 | 3/2005 |
| EP | 1645786 A2 | 4/2006 |

(Continued)

Primary Examiner — Edwin A Young

(57) ABSTRACT

A hydraulic control system for a transmission includes a pressure regular subsystem, a transmission range selection control subsystem, and a clutch control subsystem. The pressure regulator subsystem includes a source of pressurized hydraulic fluid for providing a flow of hydraulic fluid. The transmission range selection control subsystem includes a set of four valve assemblies actuated by a pair of solenoids. And the clutch control subsystem provides pressurized hydraulic fluid to a plurality of clutch actuators activated by a plurality of variable force solenoids through a plurality of valve assemblies. The plurality of valve assemblies of the clutch control subsystem are in fluid communication with the transmission range selection control subsystem, and the transmission range selection control subsystem employs the pressurized hydraulic fluid to engage a range selection through the clutch control subsystem.

16 Claims, 24 Drawing Sheets

(56) References Cited

FOREIGN PATENT DOCUMENTS

| | | |
|---|---|---|
| EP | 2151586 A2 | 2/2010 |
| FR | 2808065 A1 | 10/2001 |
| JP | 58102851 A | 8/1983 |
| JP | 2007010145 A | 1/2007 |
| WO | WO9705410 A1 | 2/1997 |
| WO | WO9919644 A1 | 4/1999 |
| WO | WO2009037170 A1 | 3/2009 |
| WO | WO2010028745 A2 | 3/2010 |

* cited by examiner

HYDRAULIC CONTROL SYSTEM FOR AN AUTOMATIC TRANSMISSION

TECHNICAL FIELD

The invention relates to a control system for an automatic transmission, and more particularly to an electro-hydraulic control system.

BACKGROUND

A typical automatic transmission includes a hydraulic control system that is employed to provide cooling and lubrication to components within the transmission and to actuate a plurality of torque transmitting devices. These torque transmitting devices may be, for example, friction clutches and brakes arranged with gear sets or in a torque converter. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to various subsystems including lubrication subsystems, cooler subsystems, torque converter clutch control subsystems, and shift actuator subsystems that include actuators that engage the torque transmitting devices. The pressurized hydraulic fluid delivered to the shift actuators is used to engage or disengage the torque transmitting devices in order to obtain different gear ratios.

While previous hydraulic control systems are useful for their intended purpose, the need for new and improved hydraulic control system configurations within transmissions which exhibit improved performance, especially from the standpoints of efficiency, responsiveness and smoothness, is essentially constant. Accordingly, there is a need for an improved, cost-effective hydraulic control system for use in a hydraulically actuated automatic transmission.

SUMMARY

A hydraulic control system for a transmission includes a pressure regular subsystem, a transmission range selection control subsystem, and a clutch control subsystem. The pressure regulator subsystem includes a source of pressurized hydraulic fluid for providing a flow of hydraulic fluid. The transmission range selection control subsystem includes a set of four valve assemblies actuated by a pair of solenoids. And the clutch control subsystem provides pressurized hydraulic fluid to a plurality of clutch actuators activated by a plurality of variable force solenoids through a plurality of valve assemblies. The plurality of valve assemblies of the clutch control subsystem are in fluid communication with the transmission range selection control subsystem, and the transmission range selection control subsystem employs the pressurized hydraulic fluid to engage a range selection through the clutch control subsystem.

Some configurations of the hydraulic control system may have one or more of the following advantages. The control system provides quick response shifting and improved fuel economy. Further, the control system provides robust failure mode coverage and improved shift control.

Further features, advantages, and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. The components in the figures are not necessarily to scale, emphasis instead being placed upon illustrating the principles of the invention. In the drawings.

DESCRIPTION

Figure 1A:
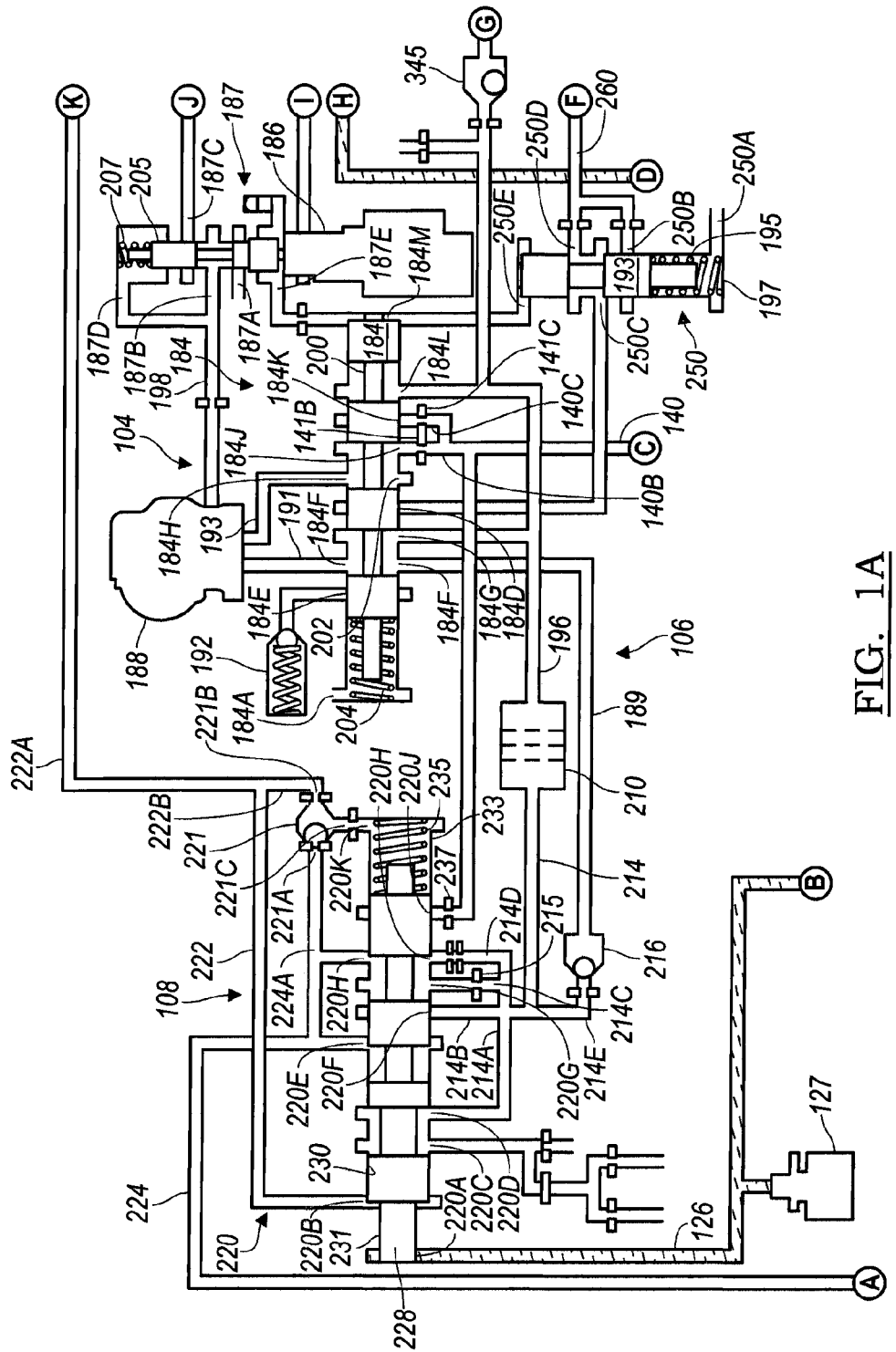
FIGS. 1A-1D is a diagram of a hydraulic control system in a first state in accordance with the principles of the present invention.
Figure 1B:
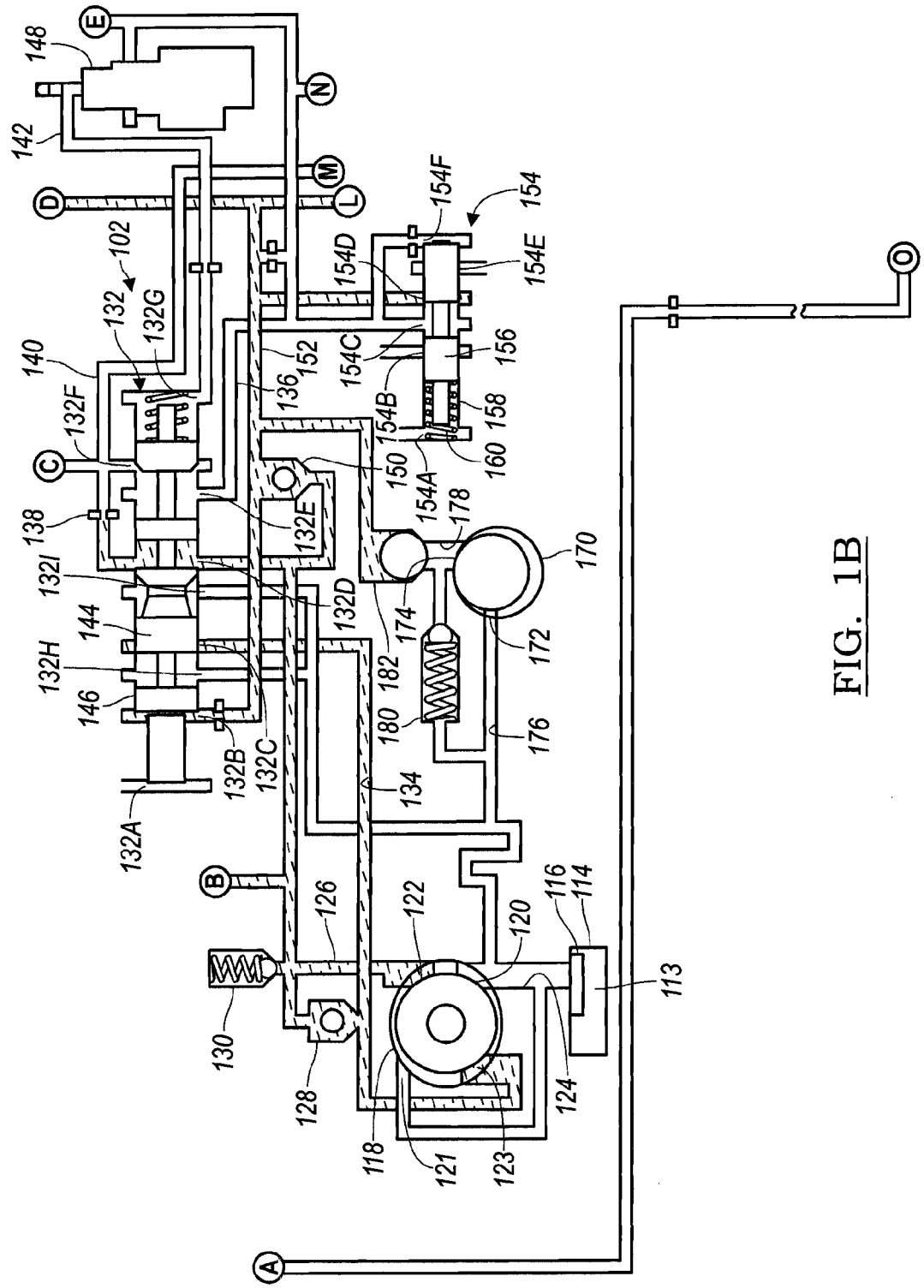
Figure 1C:
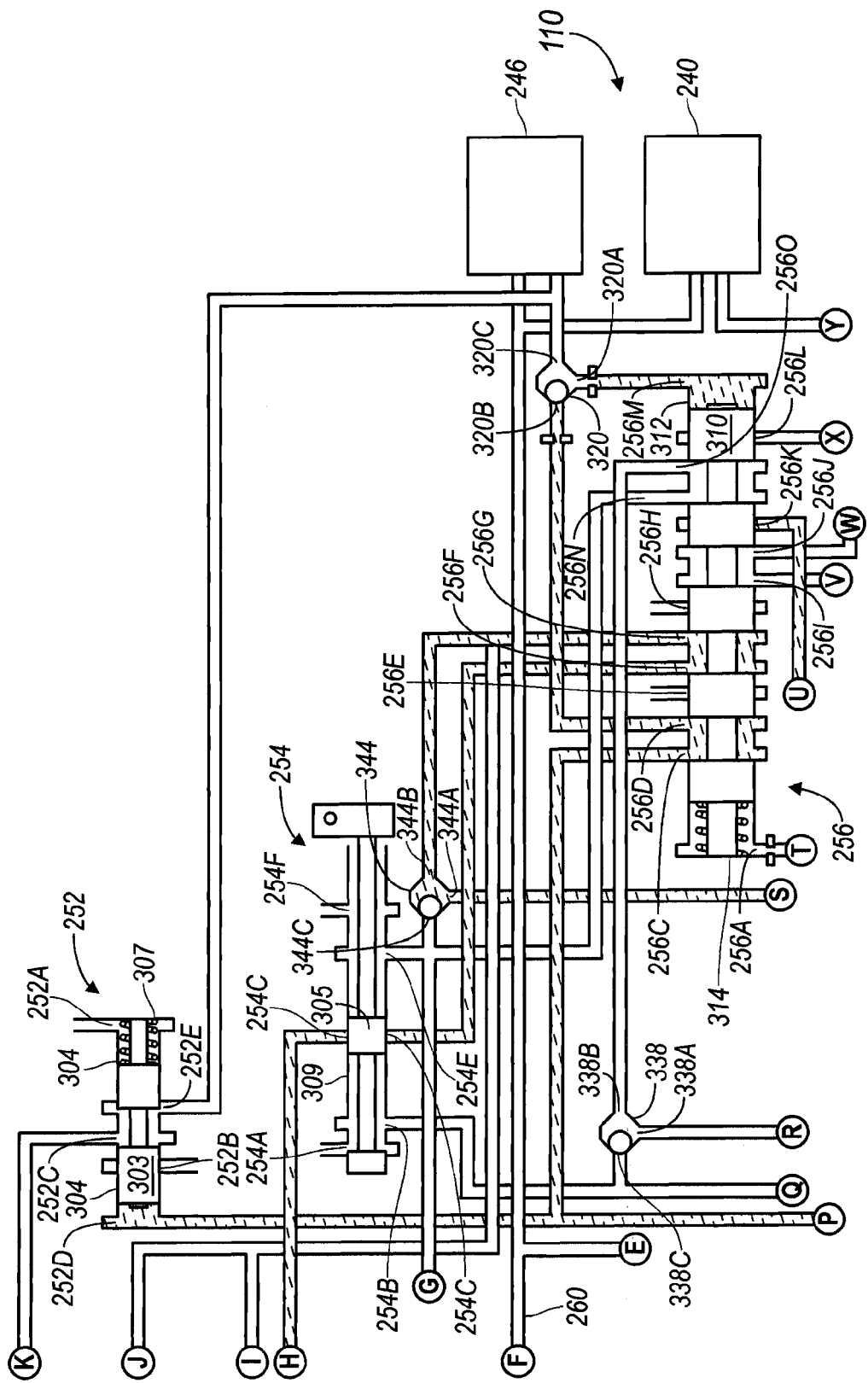
Figure 1D:
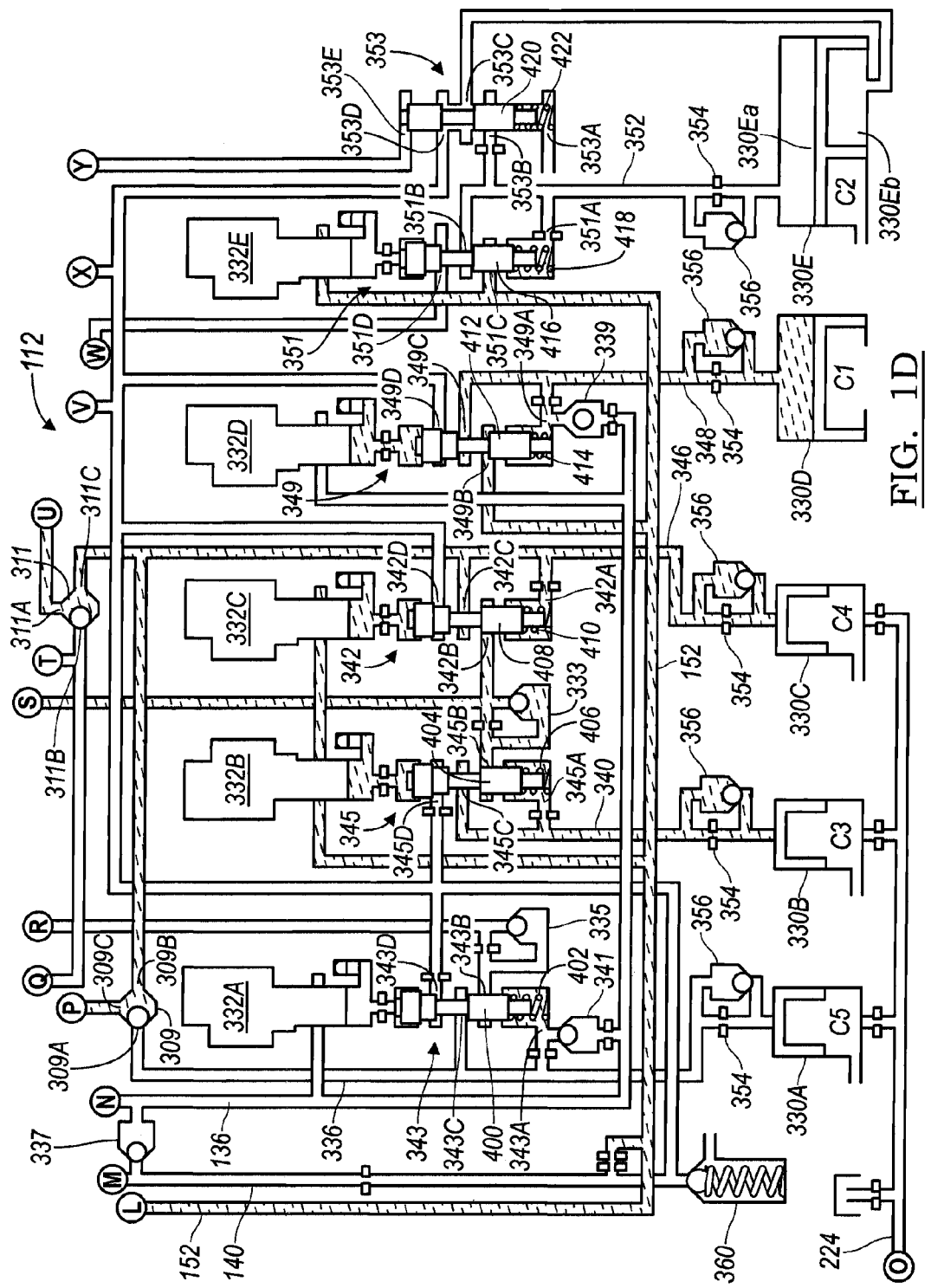

Referring now to the drawings, a hydraulic clutch control system embodying the principles of the present invention is illustrated in FIGS. 1A through 1D and designated at 100. The hydraulic control system 100 is operable to control torque transmitting mechanisms, such as synchronizers, clutches, and brakes within a transmission, as we as providing lubrication and cooling to components within the transmission and to control a torque converter coupled to the transmission. The hydraulic control system 100 includes a plurality of interconnected or hydraulically communicating subsystems including a pressure regulator subsystem 102, a torque converter control subsystem 104, a cooler flow subsystem 106, a lubrication control subsystem 108, a transmission range selection control subsystem 110, and a clutch control subsystem 112.

The pressure regulator subsystem 102 is operable to provide and regulate pressurized hydraulic fluid 113, such as oil, throughout the hydraulic control system 100. The pressure regulator subsystem 102 draws hydraulic fluid 113 from a sump 114. The sump 114 is a tank or reservoir preferably disposed at the bottom of a transmission housing to which the hydraulic fluid 113 returns and collects from various components and regions of the transmission. The hydraulic fluid 113 is forced from the sump 114 and communicated through a sump filter 116 and throughout the hydraulic control system 100 via a pump 118. The pump 118 is preferably driven by an engine (not shown) and may be, for example, a gear pump, a vane pump, a gerotor pump, or any other positive displacement pump. The pump 118 includes inlet ports 120 and 121 and outlet ports 122 and 123. The inlet ports 120 and 121 communicate with a fluid line 124 and in turn to the sump 114. The outlet ports 122 and 123 communicate pressurized hydraulic fluid 113 to a fluid line 126 and a fluid line 134, respectively. The fluid line 126 is the primary outlet fluid passage and the fluid line 134 is the secondary outlet fluid passage. The fluid line 126 is in communication with a one-way valve 128, a spring biased blow-off safety valve 130, and a pressure regulator valve 132. The one-way valve 128 is used to selectively prevent hydraulic flow into the main pump 118 when the main pump 118 is non-operational. The safety valve 130 is set at a relatively high predetermined pressure and if the pressure of the hydraulic fluid in the fluid line 126 exceeds this pressure, the safety valve 128 opens momentarily to relieve and reduce the pressure of the hydraulic fluid.

The pressure regulator valve assembly 132 includes a valve 144 slidably disposed within a bore 146 and includes ports 132A-I. Port 132A is an exhaust port that communicates with the sump 114. Port 132B is a feedback port that communicates with the fluid line 126 and provides a force balance against the pressure from a solenoid 148. The solenoid can be a variable bleed solenoid or a variable force solenoid. Port 132H is connected to the inlet ports 120 and 121 of the pump 118. Port 132C communicates with port 132H when the pump 118 has satisfied the flow demand of the transmission and excess flow from the secondary side of the pump (that is, flow from fluid line 134) can be dumped back to the pump inlet. Port 132I is also connected to the inlet ports 120 and 121 of the pump 118. Port 132D communicates with port 132I when the primary side of the pump 118 has satisfied the transmission flow demand and excess flow from the primary side of the pump (that is, flow from fluid line 126) can be pumped back to the pump inlet. Port 132E communicates with port 132F when the combined flow of the primary and secondary sides of the pump 118 begin to satisfy the transmission flow demand and excess flow can be sent to the cooler flow subsystem 106 via fluid line 140.

Fluid line 126 also communicates downstream of the pressure regulator valve assembly 132 with a one-way valve 150. The one-way valve 150 allows fluid communication from fluid line 126 to a fluid line 152 and prevents fluid communication from fluid line 152 to fluid line 126. Fluid line 152 communicates with a feed limit valve assembly 154.

The feed limit valve assembly 154 limits the maximum pressure of hydraulic fluid to the torque converter control subsystem 104, the cooler control subsystem 106 as well as various control solenoids, as will be described below. The feed limit valve assembly 154 includes ports 154A-F. Ports 154C and 154F are in communication fluid line 136 and therefore port 132E of the pressure regulator valve 132. Port 154D is in communication with fluid line 152. Ports 154A, 154B, and 154E are exhaust ports that communicate with the sump 114.

The feed limit valve assembly 154 further includes a valve 156 slidably disposed within a bore 158. The valve 156 automatically changes position to reduce flow from fluid line 152 (i.e. line pressure from the pump 118) to fluid line 136. For example, the valve 156 is biased to a first position by a spring 160. In the first position, at least a partial flow of fluid from line 152 communicates from port 154D through the feed limit valve assembly 154 to port 154C and then to fluid line 136. As the pressure within fluid line 136 increases, feedback pressure acting on the valve 156 via port 154F moves the valve 156 against the spring 160, thereby further reducing the pressure of the hydraulic fluid within fluid line 136, until a pressure balance is achieved on the valve 156. By controlling the pressure to fluid line 136 which communicates through the pressure regulator valve 132 to fluid line 140, the feed limit valve 154 controls the maximum pressure feeding the TCC control subsystem 104 and the lubrication control subsystem 108.

The pressure regulator subsystem 102 further includes an alternate source of hydraulic fluid that includes an auxiliary pump 170. The auxiliary pump 170 is preferably driven by an electric engine, battery, or other prime mover (not shown) and may be, for example, a gear pump, a vane pump, a gerotor pump, or any other positive displacement pump. The auxiliary pump 170 includes an inlet port 172 and an outlet port 174. The inlet port 172 communicates with the sump 114 via a fluid line 176. The outlet port 174 communicates pressurized hydraulic fluid to a fluid line 178. The fluid line 178 is in communication with a spring biased blow-off safety valve 180 and a one-way valve 182. The safety valve 180 is used to relieve excess pressure in fluid line 178 from the auxiliary pump 170. The one-way valve 182 is in communication with fluid line 152 and is operable to allow hydraulic fluid flow from fluid line 178 to fluid line 152 and prevent hydraulic fluid flow from fluid line 152 to fluid line 178. Therefore, during normal operating conditions, fluid flow from the pump 118 is prevented from backfilling the auxiliary pump 170 by the one-way valve 182. During high efficiency modes of operation when the engine, and therefore the pump 118, is inactive, and the auxiliary pump 170 is engaged, fluid flow from the auxiliary pump 170 is prevented from backfilling the pump 118 by the one-way valve 150.

The TCC subsystem 104 receives pressurized hydraulic fluid from the feed limit valve assembly 154 and the pressure regulator valve assembly 132 via fluid line 140. The TCC subsystem 104 includes a TCC control valve 184 and a solenoid 186 that modulates pressure to a torque converter clutch 188.

The TCC control valve assembly 184 includes port 184A, 184D-H, and 184J-M. Port 184A is an exhaust port that communicates with the sump 114. Ports 184J and 184K are each in communication with branches 140B and 140C of fluid line 140, respectively. Port 184D communicates with a port 250C of a convertor fault valve assembly 250 described below. Port 184E communicates with a safety blow-off valve 192 that release pressurized hydraulic fluid when the torque converter clutch 188 is on or engaged. Port 184F communicates with the torque converter clutch 188 via a fluid line 191 and further communicates with a fluid line 189. Ports 184G and 184L communicate with a fluid line 196. Port 184L further communicates with the transmission range control subsystem 110 through a one-way valve 345. Port 184H communicates with the torque converter clutch 188 via a fluid line 193. Fluid line 198 communicates with the VFS valve assembly 187 and with the torque converter clutch 188. The solenoid 186 is preferably a high flow, direct acting variable force solenoid, though other types of actuating devices may be employed without departing from the scope of the present disclosure. The solenoid 186 actuates VFS valve assembly 187 that includes ports 187A-E. Port 187A is an exhaust port. Ports 187B and 187D communicate with the torque convertor clutch 188 through the fluid line 198. Port 187C communicates with a mode valve assembly 256. And port 187E communicates with the TCC control valve assembly 184 through the port 184M. The VFS valve assembly 187 also includes a valve 205 biased against a spring 207.

The TCC control valve assembly 184 further includes a valve 200 slidably disposed within a bore 202. The valve 200 is actuated by the solenoid 186 that actuates the valve 200 against a spring 204. In a first position with the valve 200 not shifted against the spring 204 (i.e. a de-stroked position), hydraulic fluid from fluid line 140 is directed through the branch 140B and orifice 141B to port 184J, through the valve assembly 184 to port 184H, and then to the torque converter clutch 188. The output of the torque converter clutch 188 communicates through line 191 to port 184F of the TCC control valve assembly 184, from port 184F to port 184G and on to the cooler control subsystem 106. The valve 200 is shifted against the spring by activation of the solenoid 186. As pressure of the hydraulic fluid acting on the valve 200 from port 184M via the solenoid 186 increases, a threshold is crossed where the valve 200 is shifted against the spring 204. As the valve 200 shifts, hydraulic fluid from fluid line 140 is directed through the branches 140B-C and orifices 141B-C. For example, as the valve 200 shifts, port 184K communicates with port 184L, thereby bleeding off flow from fluid line 140 to fluid line 196, and port 184J closes thereby further reducing the fluid flow to port 184H. As the valve 200 shifts completely against the spring 204, the valve 200 diverts the output from the torque converter clutch 188 via port 184F to port 184E such that the hydraulic fluid leaving the torque converter clutch 188 returns to the sump 114 via the blow-off valve 192. Accordingly, the TCC control valve 184 controls the flow rate of hydraulic fluid to the torque converter clutch 188 and to the oil cooler subsystem 106.

The convertor fault valve assembly 250 includes ports 250A-E and a valve 193 slidably disposed within a bore 195 and a spring 197 that applies a bias to the valve 193 towards port 250E, which communicates with the TCC control valve assembly 184 through port 184M. Port 250A is an exhaust port. Ports 250B and 250D communicate with a fluid line 260. Port 250C communicates with the TCC control valve assembly 184 through port 184D.

The cooler control subsystem 106 includes an oil cooler 210 that is in communication with fluid line 196. Fluid line 214 includes four branches 214A-D that communicate with the lubrication control subsystem 108 and a fifth branch 214E that communicates with a one-way valve 216. Branch 214C includes a flow restricting orifice 215, or override orifice, used to control fluid flow through the lubrication subsystem 108, as will be described in greater detail below. The one-way valve 216 communicates with fluid line 189. If the pressure of the hydraulic fluid in the fluid line 214E exceeds a pressure threshold, the one-way valve 216 opens momentarily to relieve and reduce the pressure of the hydraulic fluid within fluid line 214E.

The lubrication control subsystem 108 regulates lubrication fluid pressure as a function of line pressure delivered from the pump 118 or auxiliary pump 170. Hydraulic fluid regulated by the lubrication control subsystem 108 lubricates and cools the various moving parts of the transmission and provides the source of hydraulic fluid for filling a clutch centrifugal compensator. The lubrication control subsystem 108 receives hydraulic fluid from the cooler flow subsystem 106 via fluid line 214.

The lubrication control subsystem 108 includes a lubrication regulator valve assembly 220 and a ball check valve 221. The ball check valve 221 includes three ports 221A-C. The ball check valve 221 closes off whichever of the ports 221A and 221B that is delivering the lower hydraulic pressure and provides communication between whichever of the ports 221A and 221B having or delivering the higher hydraulic pressure and the outlet port 221C.

The lubrication regulator valve assembly 220 includes ports 220A-H, J, and K. Port 220A communicates with fluid line 126 and therefore receives line pressure from the pump 118. Port 220B communicates with a fluid line 222. Fluid line 222 includes two branches 222A and 222B. Branch 222A communicates with the transmission range selection control subsystem 110 and branch 222B communicates with port 221B of the ball check valve 221. Port 220C is an exhaust port that communicates with the sump 114. Port 220D communicates with fluid line 214A. Ports 220E and 220H communicate with a fluid line 224. Fluid line 224 includes a branch 224A that communicates with port 221A of the ball check valve 221. Port 220H also communicates with branch 214D of fluid line 214. Ports 220E-G communicate with branches 214B and 214C of fluid line 214, respectively. Port 220J communicates with fluid line 140. Finally, port 220K communicates with port 221C of the ball check valve 221.

The lubrication regulator valve assembly 220 further includes a valve 228 slidably disposed within a bore 230. The valve has a first end 231 and a second end 233. The valve 228 has three functional positions: a basic regulating position, a supplemental regulating position, and an override position. The valve 228 is moved between the positions based on a balance of forces acting on each of the first end 231 and the second end 233 of the valve 228. The basic regulating position provides an output pressure via fluid line 224 that is proportional to the line pressure (i.e. the pressure in fluid line 126). In the basic regulating position, line pressure via fluid line 126 enters port 220A and acts on an end of the valve 228 against the bias of a spring 235. As the valve 228 strokes against the spring 235, port 220F communicates with port 220E. Accordingly, hydraulic fluid flow from the cooler subsystem 106 communicates from fluid line 214B to port 220F, through the valve 228, and out fluid port 220E to fluid line 224. Feedback pressure from fluid line 224 communicates through branch 224A, through the ball check valve 221, and into the valve assembly 220. The hydraulic fluid acts on the valve 228 and creates a balancing force against the line pressure which keeps the valve 228 in a position to regulate the fluid flow to fluid line 224. In addition, ports 220J, 220C, and 220G are isolated by the valve 228, which in turn keeps the fluid pressure within fluid line 140 high.

If the fluid flow from the cooler subsystem 106 drops sufficiently, the line pressure acting on the valve 228 from fluid line 126 will move the valve 228 to the supplemental or stroked position. In the supplemental position, fluid flow from the cooler subsystem 106 increased by opening port 220F to port 220E. Further, fluid flow from the feed limit valve 154 is communicated to the lubrication control valve 220 via fluid line 140 moving from port 220J to 220H, thereby increasing the fluid flow to fluid line 224. A flow restriction orifice 237 in fluid line 140 limits the flow of hydraulic fluid to the lubrication control valve 220.

The transmission range control subsystem 110 will now be described. The transmission range selection control subsystem 110 uses line pressure hydraulic fluid from the pump 118 or the auxiliary pump 170 via fluid line 152 to engage a range selection via the clutch control subsystem 112. The transmission range selection control subsystem 110 is controlled using the hydraulic fluid from the feed limit control valve assembly 154. The transmission range selection control subsystem 110 includes a boost solenoid 240 and a default solenoid 246. Each of the solenoids 240 and 246 are normally low, on-off solenoids that are each supplied with hydraulic fluid via fluid passage 260. The solenoids 240 and 246 are employed to actuate an enabler valve assembly 252, and a default mode valve assembly 256 and to override the lubrication control valve 220.

The enabler valve assembly 252 includes ports 252A-E and a valve 303 slidably disposed within a bore 304. The valve 303 further includes a spring 307 that applies a bias to the valve 303 towards port 252D, which communicates with the clutch control subsystem 112 and the default mode valve assembly 256. Ports 252A and 252B are exhaust ports. Port 252C communicates with the lubrication regulator valve assembly 220 via fluid line 222A. And port 252E communicates with the default mode valve assembly 256 and the default solenoid 246.

The manual valve assembly 254 generally includes a valve 305 slidably disposed in a bore 309 and ports 254A-C, E, and

F. Ports 254A and 254F are exhaust ports that communicate with the sump 114. Port 254B communicates with the default mode valve assembly 256 and the clutch control subsystem 112. Port 254C communicates with the default mode valve assembly 256 and the pressure regulator subsystem 102 and the clutch control subsystem 112. And port 254E communicates with the default mode valve assembly 256, the torque converter control subsystem 104, the cooler flow subsystem 106, and the clutch control subsystem 112.

A ball check valve 338 is disposed between the manual valve assembly 254 and the default mode valve assembly 256. The check valve 338 includes ports 338 A-C. Port 338A communicates with the clutch control subsystem 112. Port 338B communicates with the default mode valve assembly 256. And port 338C communicates with the manual valve assembly 254 and the clutch control subsystem 112.

The default mode valve assembly 256 includes ports 256A, C-O. Ports 256A, 256I, 256J, 256K, and 256L communicate with the clutch control subsystem 112. Port 256C communicates with the enabler valve assembly 252 and the clutch control subsystem 112. Port 256D communicates with Port 256M. Ports 256E and 256H are exhaust ports that communicate with the sump 114. Port 256N communicates with the manual valve assembly 254, and port 256O communicates with the clutch control subsystem 112.

The default mode valve assembly 256 further includes a valve 310 slidably disposed within a bore 312. The valve 310 is actuated by the solenoid 246 and a spring 314. The valve 310 is moveable between a stroked state where the spring 314 is compressed and a de-stroked position. A ball check valve 320 is disposed between the default mode valve assembly 256 and the solenoid 246, and a ball check valve 344 is disposed between the default mode valve assembly 256, the torque converter control subsystem 104, the cooler flow subsystem 106, and the clutch control subsystem 112. The ball check valve 320 includes three ports 320A-C. Ports 320A and 320B communicate with the default mode valve assembly 256 through ports 256M and 256D, respectively. Port 320C communicates with the solenoid 246 and the enabler valve assembly 252. The ball check valve 344 includes ports 344 A-C. Port 344A communicates with the clutch control subsystem 112. Port 344B communicates with the default mode valve assembly 256. And port 344C communicates with the torque converter control subsystem 104 and the cooler flow subsystem 106.

The clutch control subsystem 112 provides hydraulic fluid to clutch actuators 330A-E. The clutch actuators 330A-E are hydraulically actuated pistons that each engage one of the plurality of torque transmitting devices to achieve various speed ratios. Clutch actuator 330E includes two apply areas 330Ea and 330Eb. Each of the clutch actuators 330A-E are controlled by variable force solenoids 332A-E through a set of valve assemblies 343, 345, 342, 349, and 351. Clutch actuator 330E is further controlled by the boost solenoid 240 through a valve assembly 353. This separate control of clutch actuator 330E provides maximum flexibility to tailor clutch torque characteristics to a wide range of high torque and low torque shifting conditions. Solenoids 332A and 332D communicate with fluid line 136, and solenoids 332B, 332C, and 332E communicate with fluid line 152.

Valve assembly 343 includes ports 343A-D. Port 343A communicates with a one-way check valve 341 and valve assembly 349 via one-way check valve 339, port 343C, the clutch actuator 330A, and the transmission range selection control subsystem 110. Port 343B communicates with the transmission range selection control subsystem 110 in conjunction with a one-way check valve 335. And port 343D communicates with the transmission range selection control subsystem 110, valve assembly 345 (port 345D), valve assembly 342 (port 342D), valve assembly 349 (port 349D), and valve assembly 353 (port 353D). The valve assembly 343 further includes a valve 400 actuated by the solenoid 332A in combination with a spring 402.

In addition to port 345D, valve assembly 345 includes ports 345A-C. Port 345A communicates with the clutch actuator 330B and port 345C. Port 345B communicates with the transmission range selection control subsystem 110 and the valve assembly 342 (port 342B) in conjunction with a check valve 333. The valve assembly 345 includes a valve 404 actuated by the solenoid 332B in combination with a spring 406.

In addition to ports 342B and 342D, valve assembly 342 includes ports 342A and 342C. Port 342A communicates with port 342C, the transmission range selection control subsystem 110, and the clutch actuator 330C. The valve assembly 342 includes a valve 408 actuated by the solenoid 332C and a spring 410.

In addition to port 349D, valve assembly 349 includes ports 349A-C. Port 349C communicates with port 349A and the clutch actuator 330D. Port 349B communicates with the pressure regulator subsystem 102, the transmission range selection control subsystem 110, specifically the manual valve assembly 254 (port 254C), the solenoids 332B, 332C, and 332E and the valve assembly 351 (port 351C). The valve assembly 349 includes a valve 412 actuated by the solenoid 332D and a spring 414.

In addition to port 351C, valve assembly 351 includes ports 351A, 351B, and 351D. Port 351A communicates with port 351B, the valve assembly 353 (port 353B), and the clutch actuator 330Ea. Port 351D communicates the default mode valve assembly 256 (port 256J). The valve assembly 351 includes a valve 416 actuated by the solenoid 332E and a spring 418.

In addition to ports 353B and 353D, valve assembly 353 includes ports 353A, 353C, and 353E. Port 353A is an exhaust port that communicates with the sump 114. Port 353C communicates with the clutch actuator 330EB. Finally, port 353E communicates with the boost solenoid 240. The valve assembly further includes a valve 420 biased by a spring 422 and is actuated by the spring 422 and the boost solenoid 240.

The clutch control subsystem 112 further includes a one-way check valve 337 disposed between the lines 140 and 136, a ball check valve 309, and a ball check valve 311. The ball check valve 309 includes ports 309A-C. Port 309A communicates with the clutch actuator 330A and the valve assembly 343. Port 309B communicates with the valve assembly 342, the clutch actuator 330C, and the transmission range selection control subsystem 110. And port 309C communicates with the transmission range selection control subsystem 110. The ball check valve 311 includes ports 311A-C. Ports 311A and 311B communicate with the transmission range selection control subsystem 110. And port 311C communicates with the valve assembly 342 and the clutch actuator 330C.

A safety valve 360 in communication with fluid line 140 is set at a predetermined pressure to regulate the pressure of the hydraulic fluid within the fluid line 140. This ensures that the clutch control circuits remain full when not being used to minimize response time. Fluid line 140 is fed by feed limit pressure oil. Each of the solenoids 332A-E are chosen as either normally closed or normally open so that a default gear can be attained in the case of electrical power loss.

In addition, each of the fluid lines 336, 340, 346, 348, and 352 that feed the clutch actuators 330A-E includes an orifice 354 disposed in parallel with a one way valve 356. The orientation of the one-way valve 356 is such that the one way valve 356 allows communication from the clutch actuators 330A-E to the solenoids 332A-E and prevents fluid communication from the solenoids 332A-E to the shift actuators 330A-E. This arrangement forces oil feeding the shift actuators 330A-E to be controlled through the orifices 354.

In the particular configuration shown in FIGS. 1A-D, the clutch control subsystem 112 includes a check valve release option, namely, the use of the one-way check valves 333 and 335. In this configuration, the manual valve assembly 254 is set in the park position. Port 254C of manual valve assembly 254 communicates with port 256F of the default mode valve assembly 256. Port 256G of the default mode valve assembly communicates with the valve assemblies 345 and 342 in conjunction with the check valve 333. Meanwhile, port 256C communicates with the valve assembly 342 via the check valves 309 and 311 and with the enabler valve assembly 252 through port 252D. Pressure in port 256D is less than that of port 256M since the pressure from port 256M and the solenoid 246 closes the port 320B of the check-valve 320.

Further, with port 311B of the check valve 311 closed and with port 309A of the check valve 309 closed, port 256K of the default mode valve assembly 256 communicates with the valve assembly 342. Port 254C of the manual valve assembly 254 also communicates with the solenoids 332B, 332C, and 332E and the valve assemblies 349 and 351 through ports 349B and 351C, respectively.

Figure 2A:
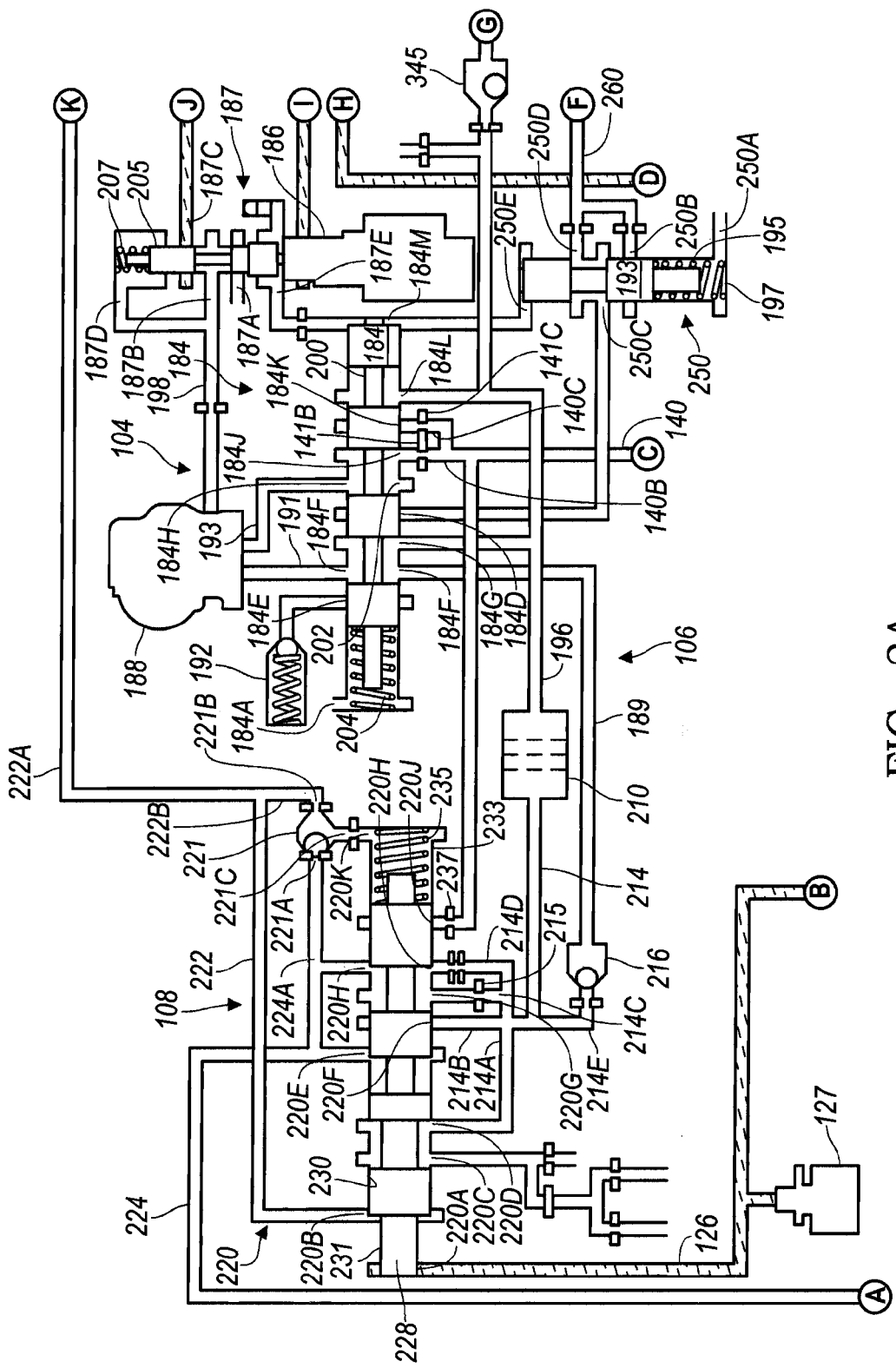
FIGS. 2A-2D is a diagram of the hydraulic control system in a second state in accordance with the principles of the present invention.
Figure 2B:
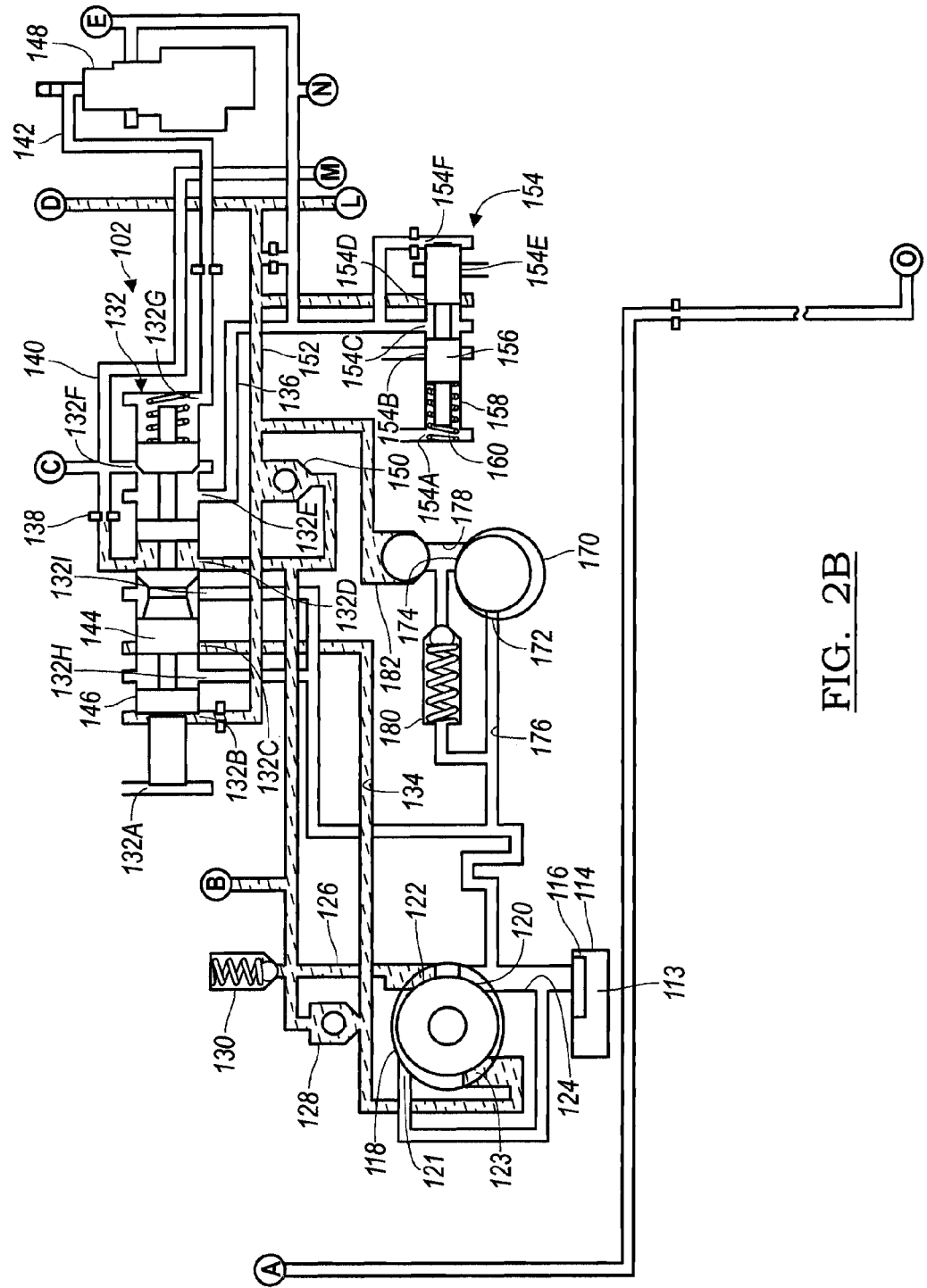
Figure 2C:
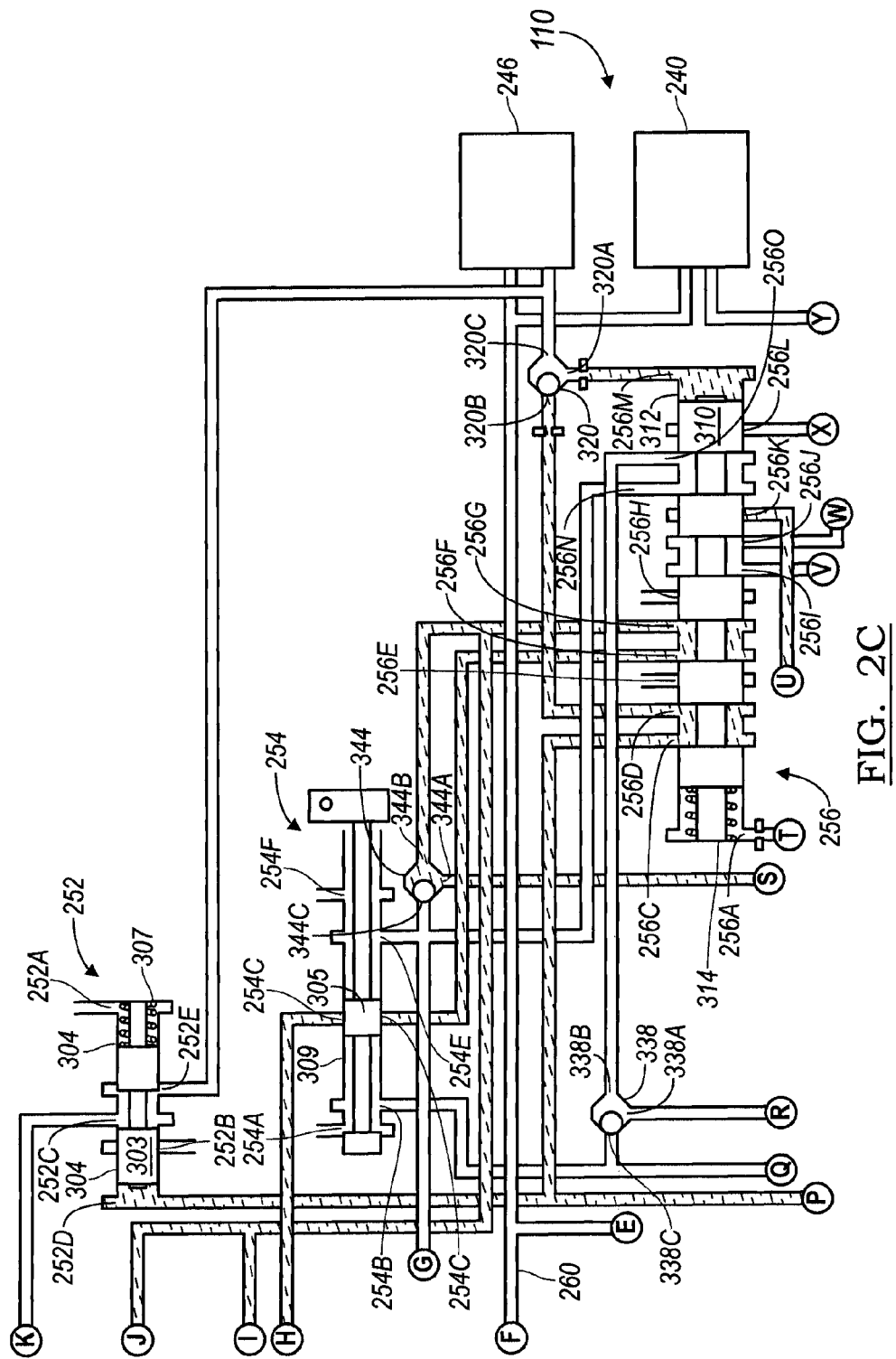
Figure 2D:
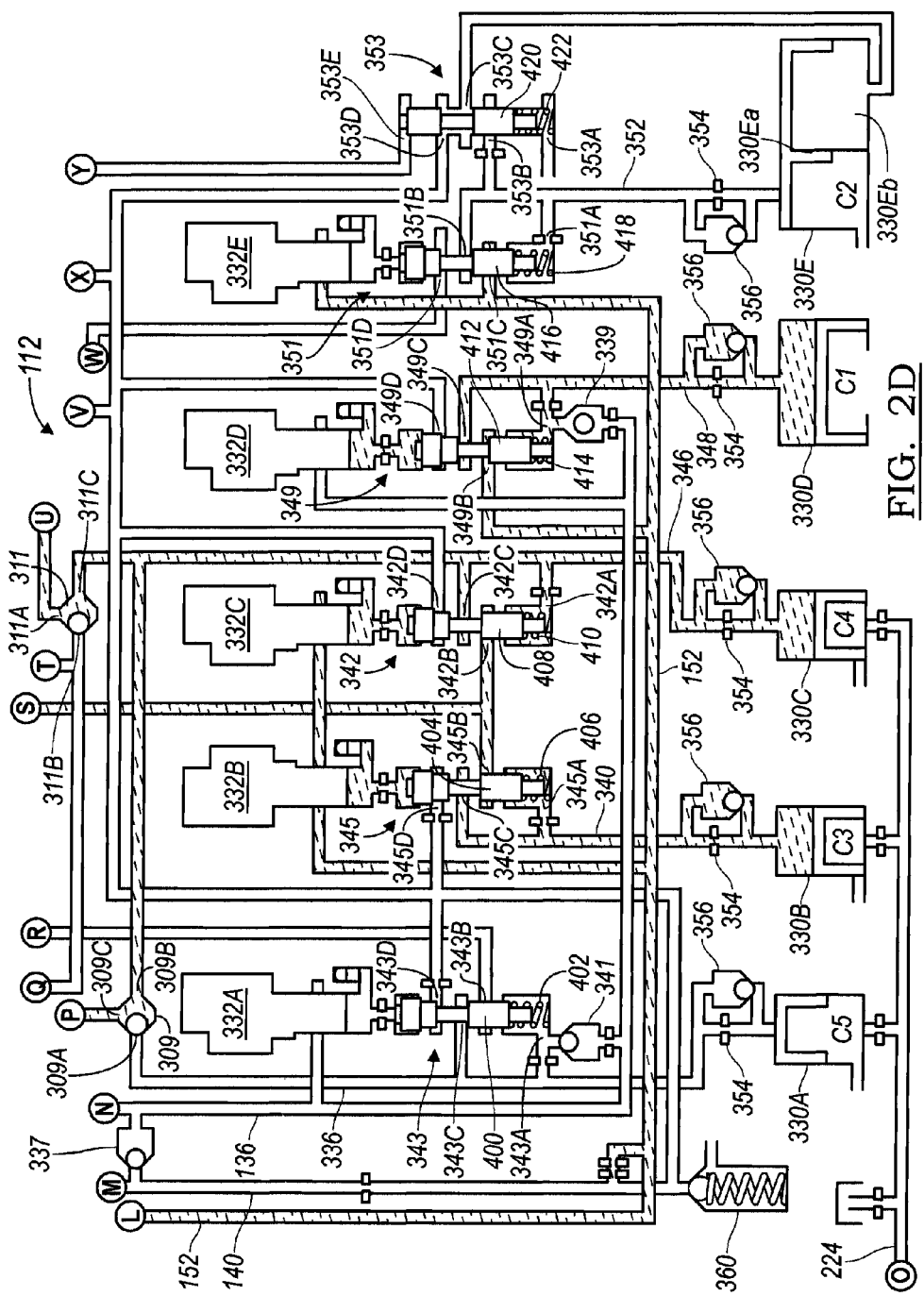

As such, valve assembly 349 activates the clutch actuator 330D. In another configuration, as shown in FIGS. 2A-D, the one-way check valves 333 and 335 are not implemented. Other than the absence of the check valves 333 and 335, the communication with the valve assemblies 345, 342 and 349 the various components is the similar as described above with reference to FIGS. 1A-D, with valve assembly 345 engaging clutch actuator 330B, valve assembly 342 engaging clutch actuator 330, and valve assembly 349 engaging clutch actuator 330D.

Figure 3A:
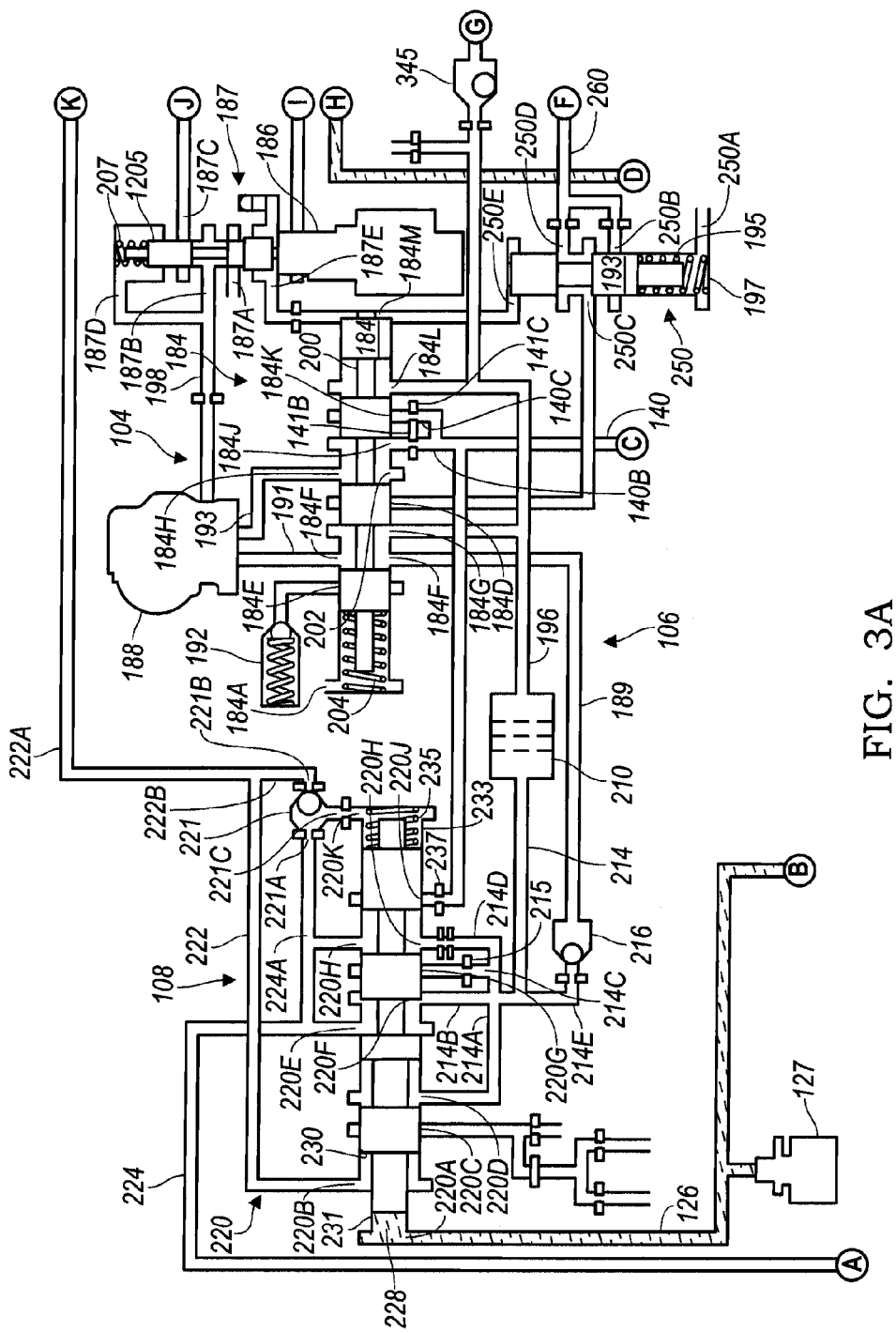
FIGS. 3A-3D is a diagram of the hydraulic control system in a third state in accordance with the principles of the present invention.
Figure 3B:
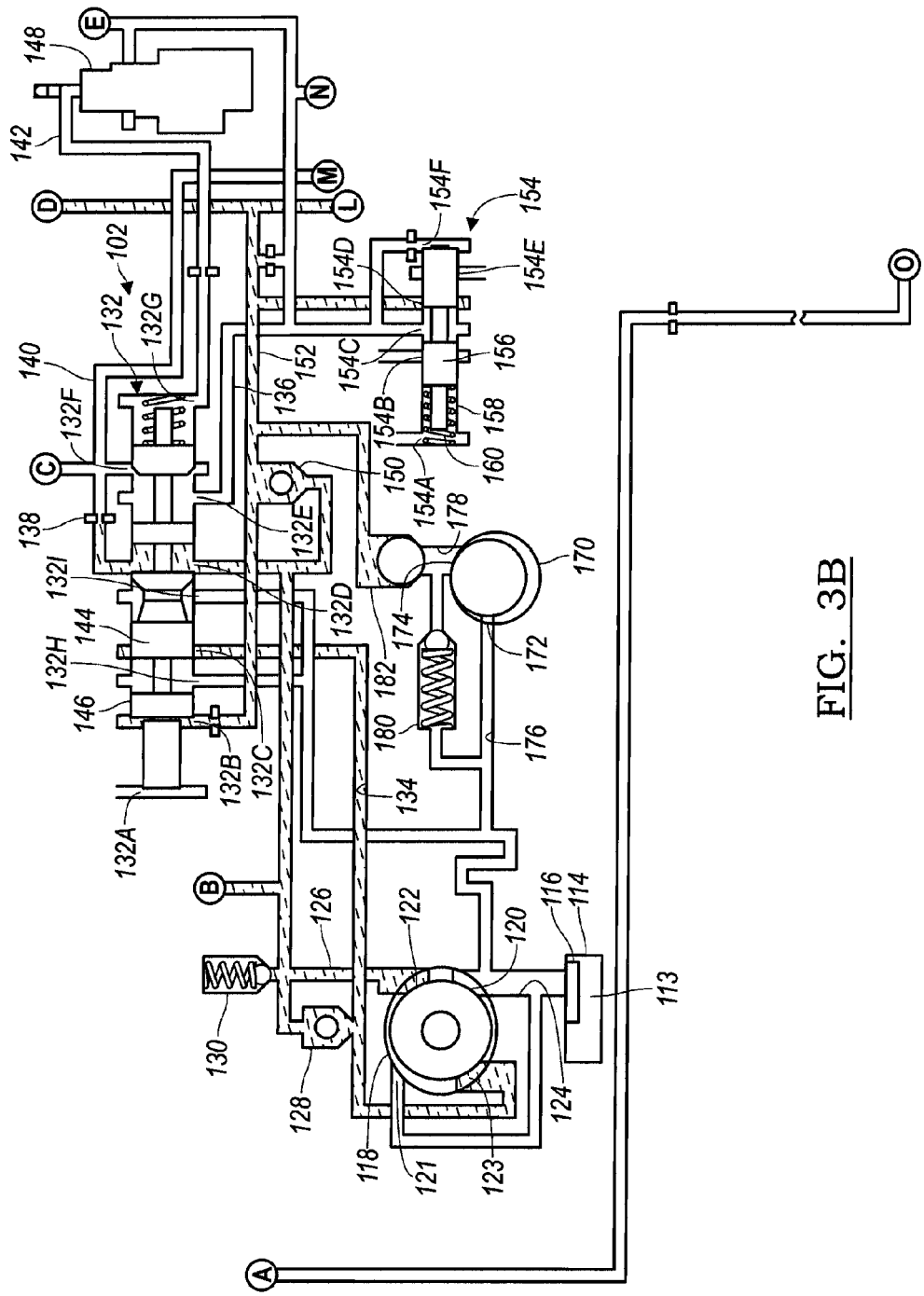
Figure 3C:
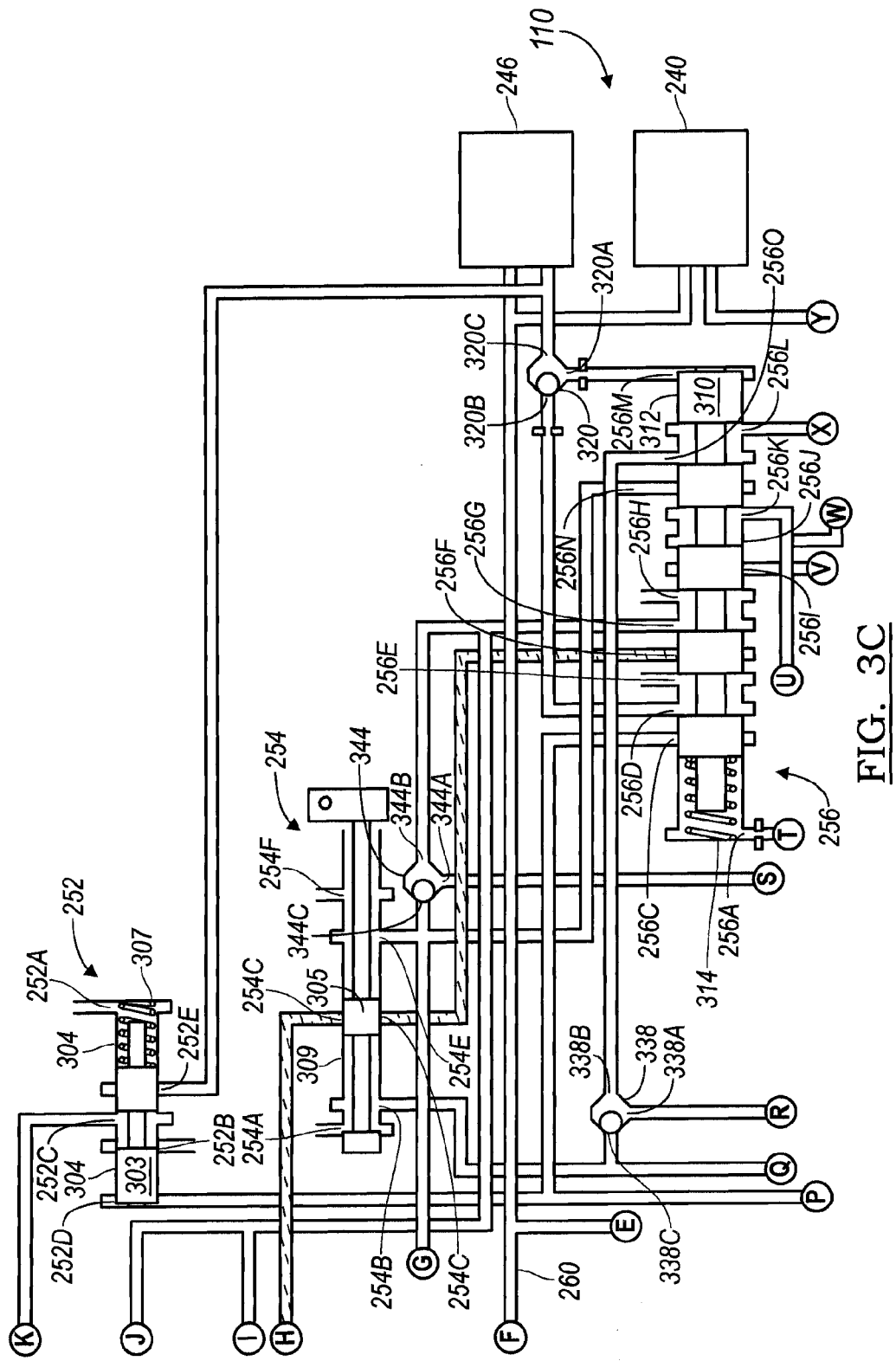
Figure 3D:
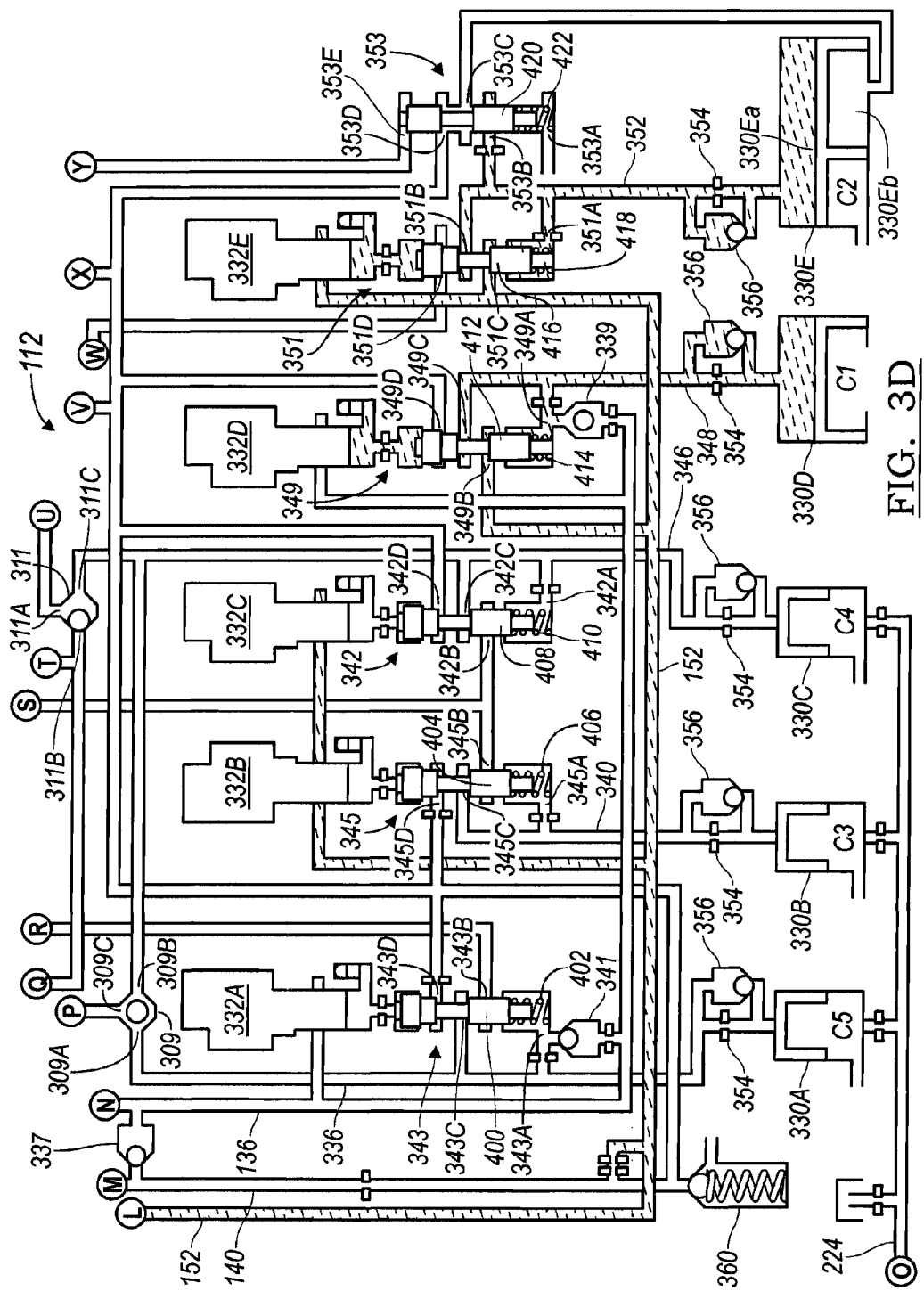

With reference to FIGS. 3A-D, the manual valve assembly 254 is set to park such that port 254C communicates with the default mode valve assembly 254 through port 256F and with solenoids 332B and 332C to close off the respective valve assemblies 345 and 342. Port 254C further communicates with the valve assembly 349 via port 349B, with the solenoid 332E, and with the valve assembly 351 through port 351C. In turn, the valve assembly 349 engages the actuator 330D, and the valve assembly 351 engages the clutch actuator 330Ea.

Figure 4A:
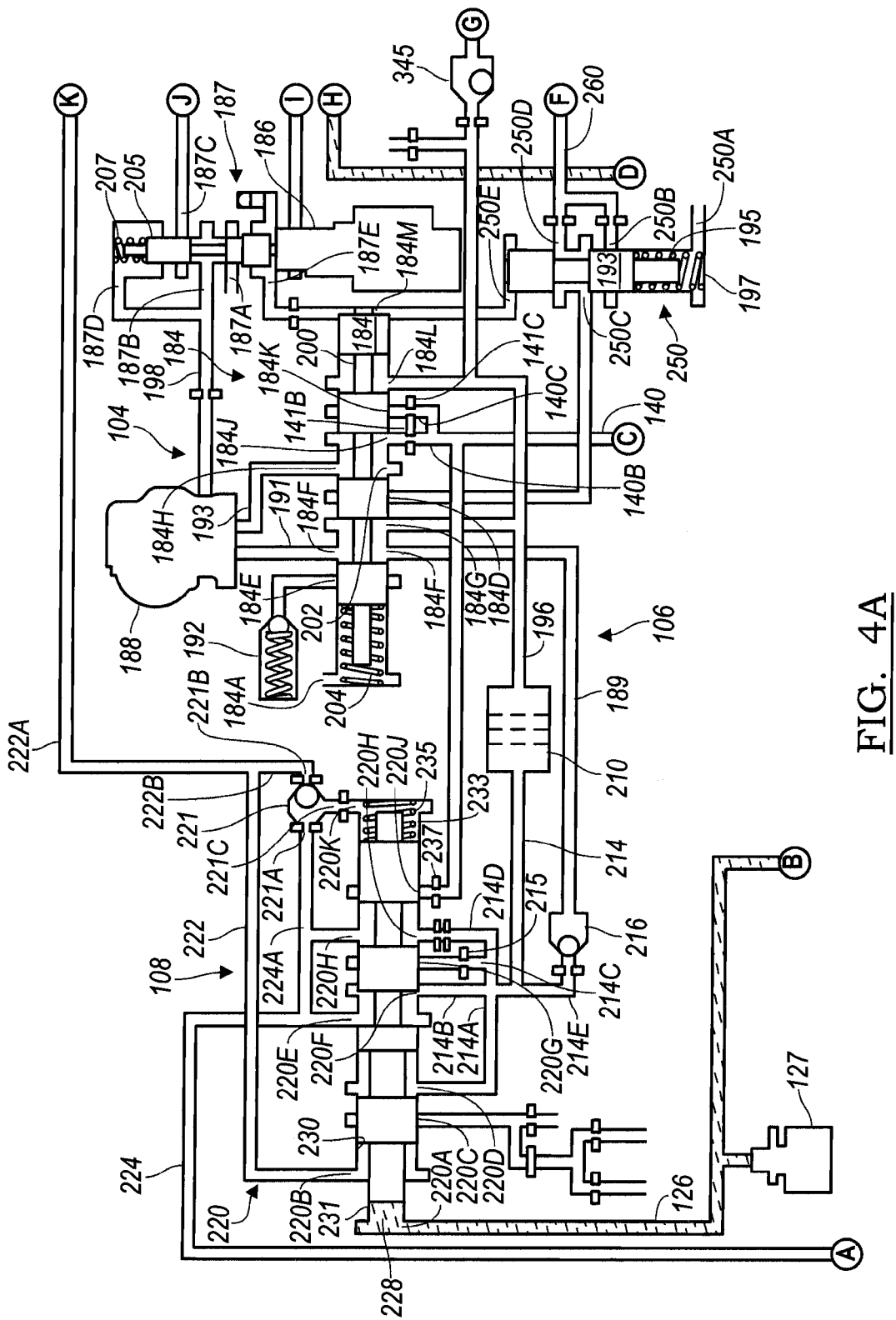
FIGS. 4A-4D is a diagram of the hydraulic control system in a fourth state in accordance with the principles of the present invention.
Figure 4B:
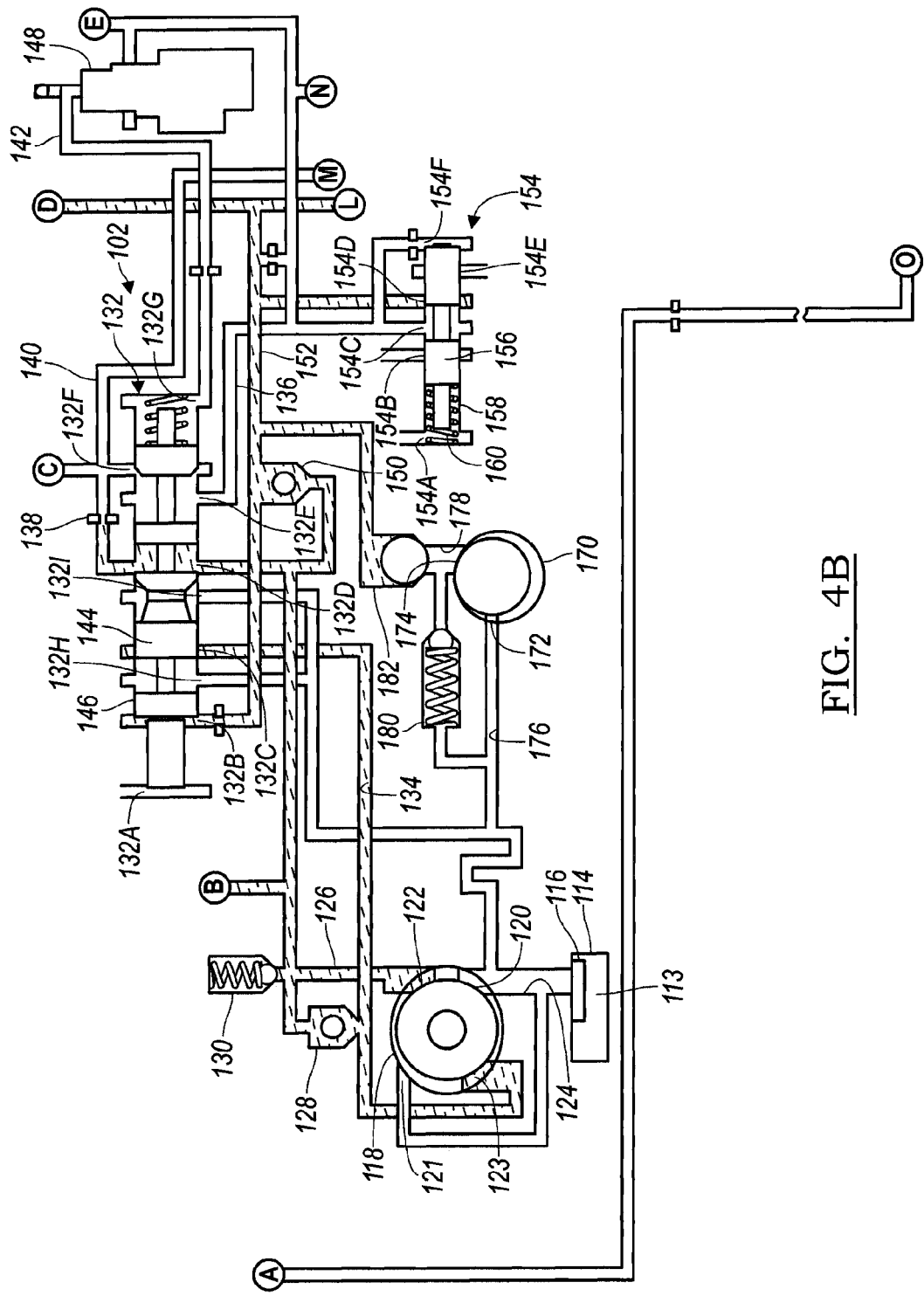
Figure 4C:
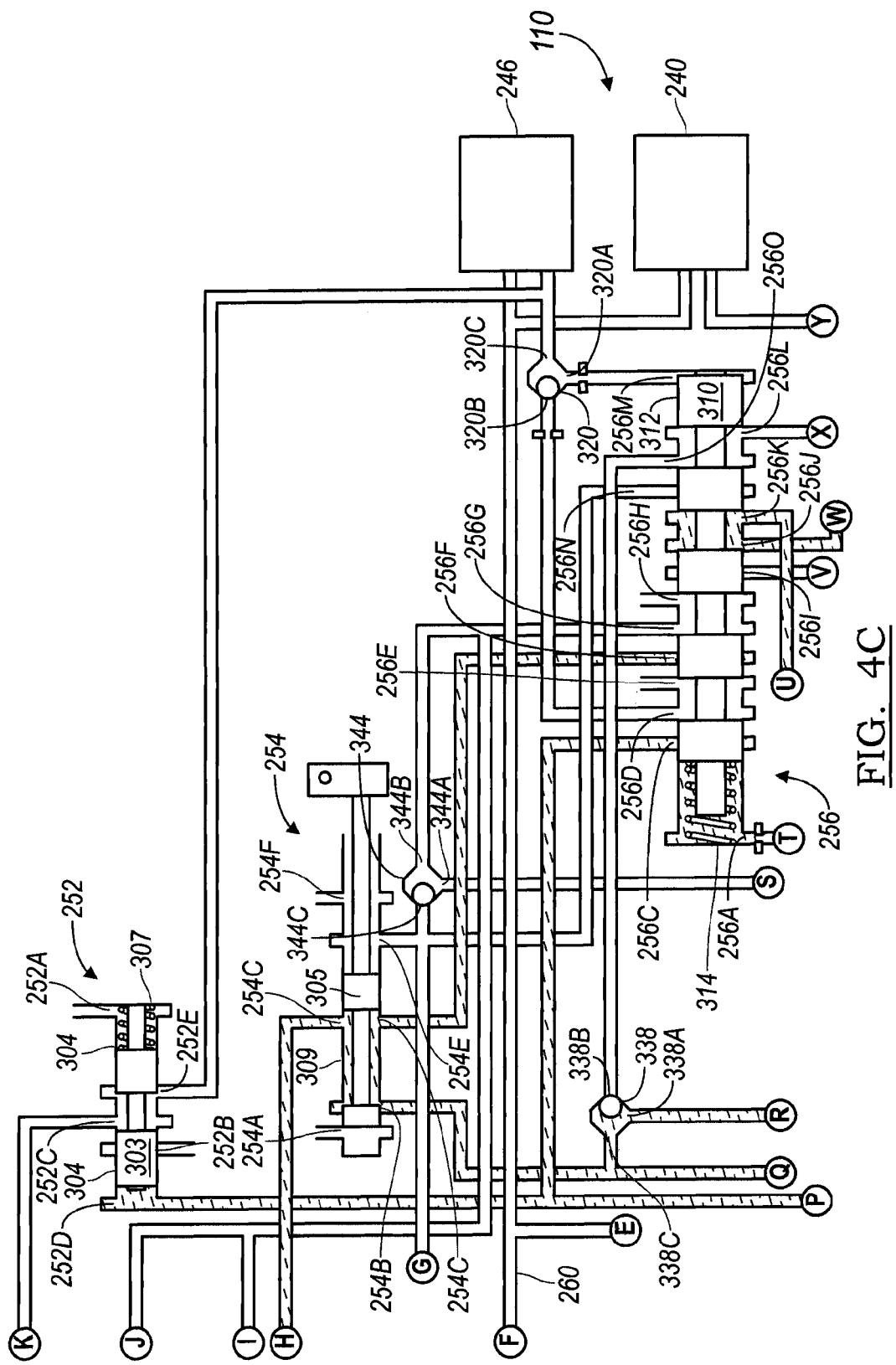
Figure 4D:
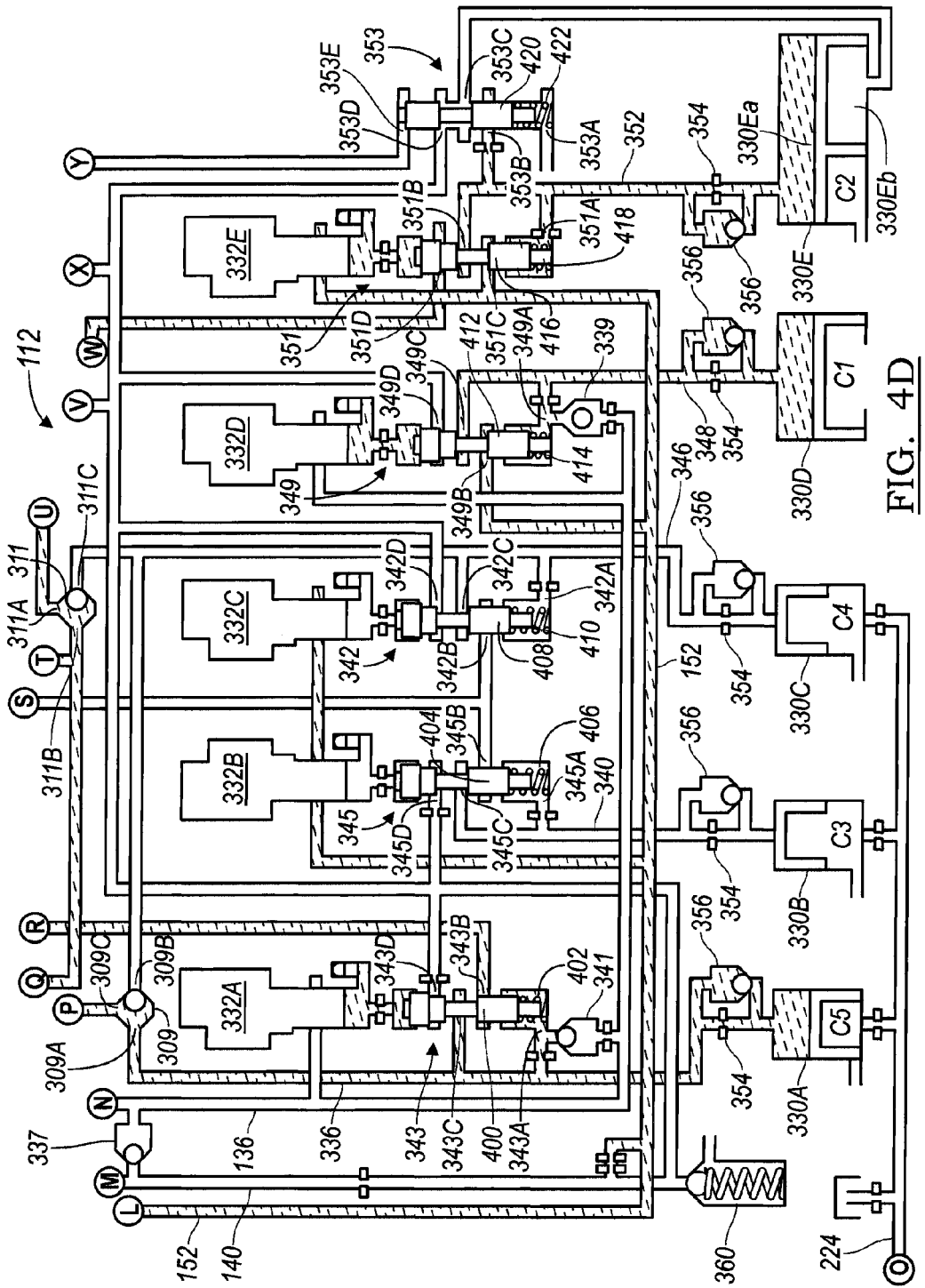

When the manual valve assembly 254 is set in reverse, as shown in FIGS. 4A-D, the enabler valve assembly 252 communicates through port 252D with port 256C of the default mode valve assembly 256, the valve assembly 343 via ports 343A and 343C, and the clutch actuator 330A. Port 254B of the manual valve assembly communicates with ports 256A and 256K of the default mode valve assembly 256 and with the valve assembly 343 via port 343B. Port 254C of the manual valve assembly 254 communicates with the default mode valve assembly 256 through port 256F. Port 256J of the default mode valve assembly 256 communicates with the valve assembly 351 through port 351D. Finally, through port 254C, manual valve assembly 254 communicates with the solenoids 332B, 332C, and 332E, and with valve assemblies 349 through port 349B and 351 through port 351C. Accordingly, the valve assembly 343 engages the clutch actuator 330A, the valve assembly 349 engages the clutch actuator 330D, and the valve assembly 351 in connection with the valve assembly 353 engages the clutch actuator 330Ea.

Figure 5A:
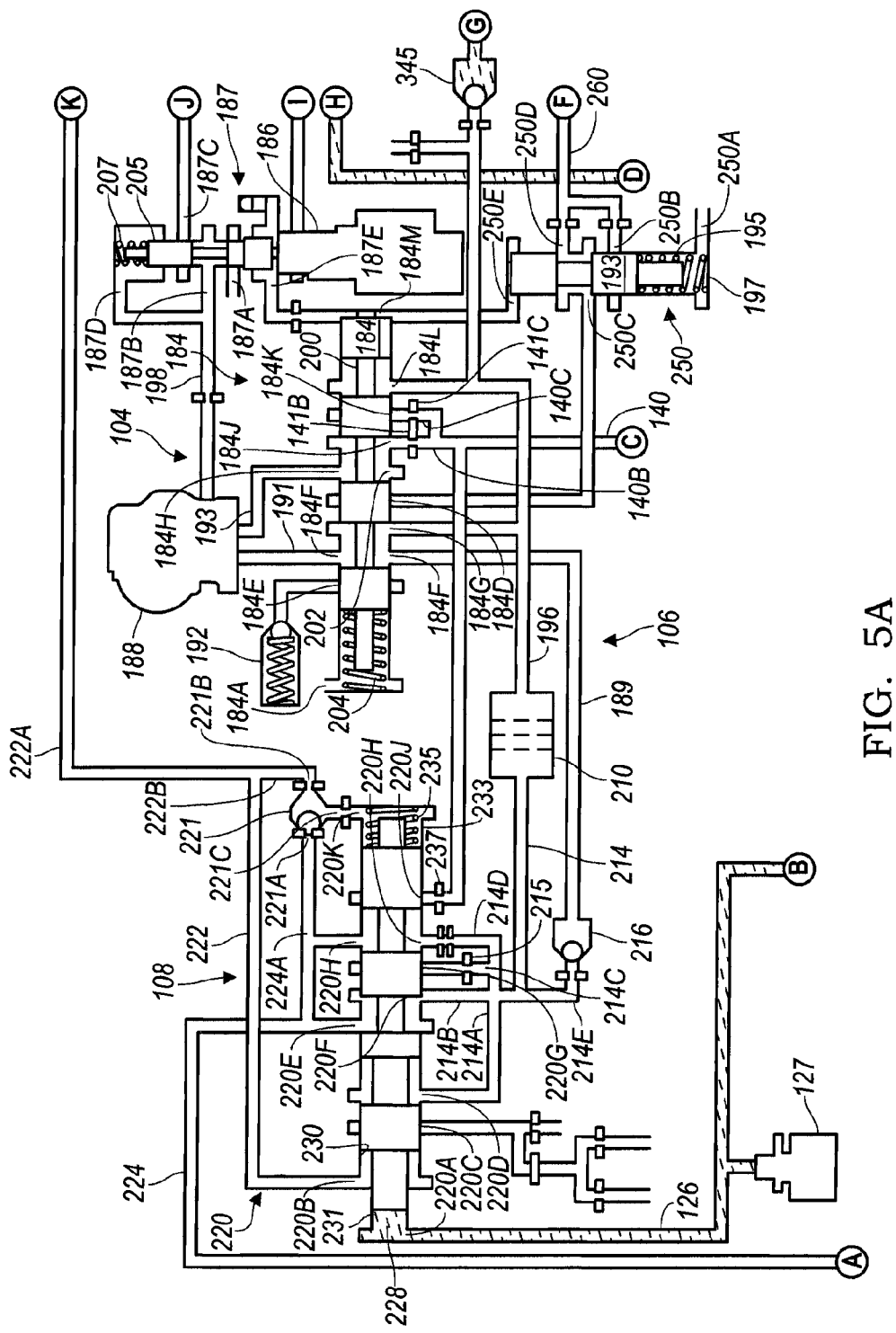
FIGS. 5A-5D is a diagram of the hydraulic control system in a fifth state in accordance with the principles of the present invention.
Figure 5B:
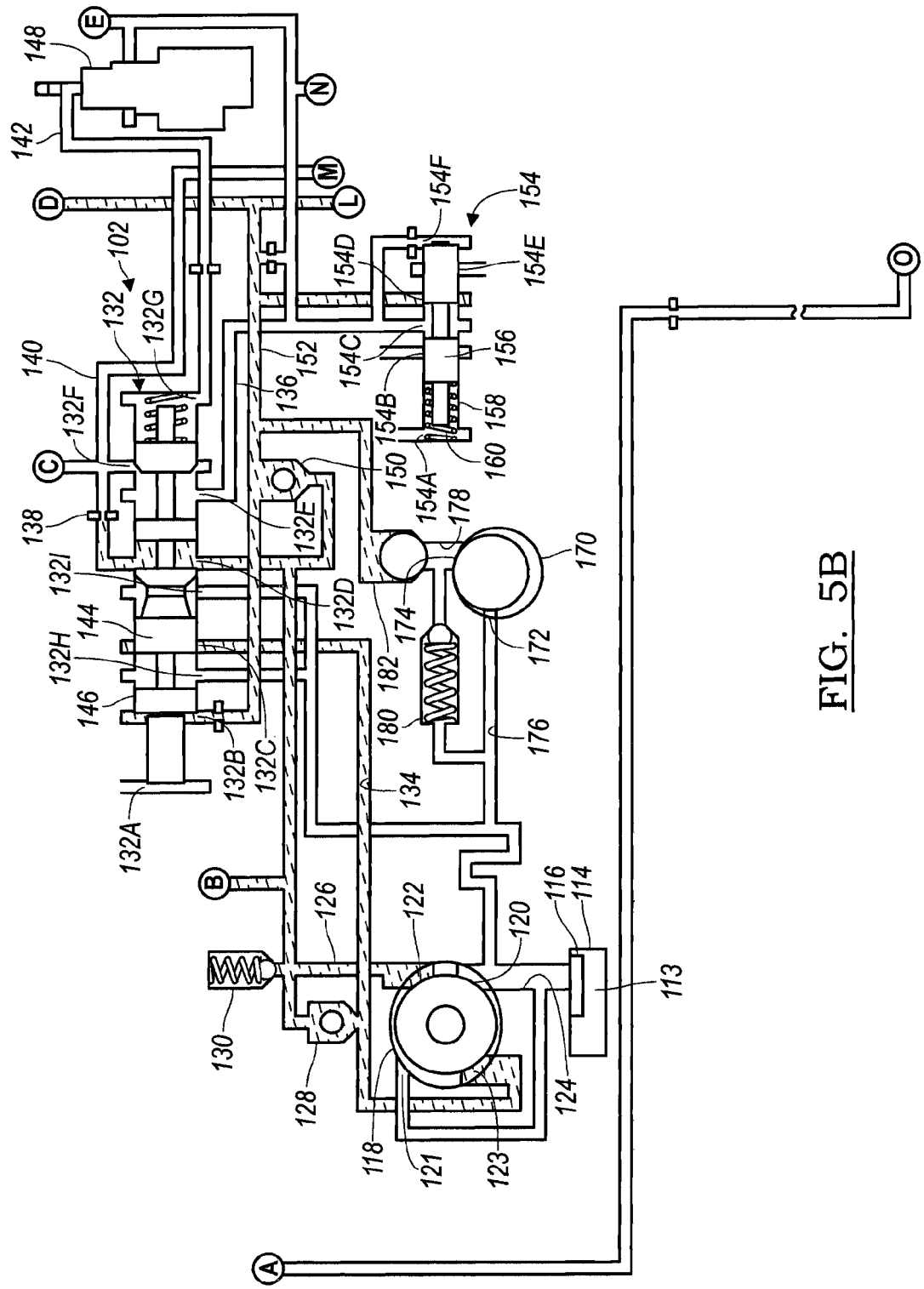
Figure 5C:
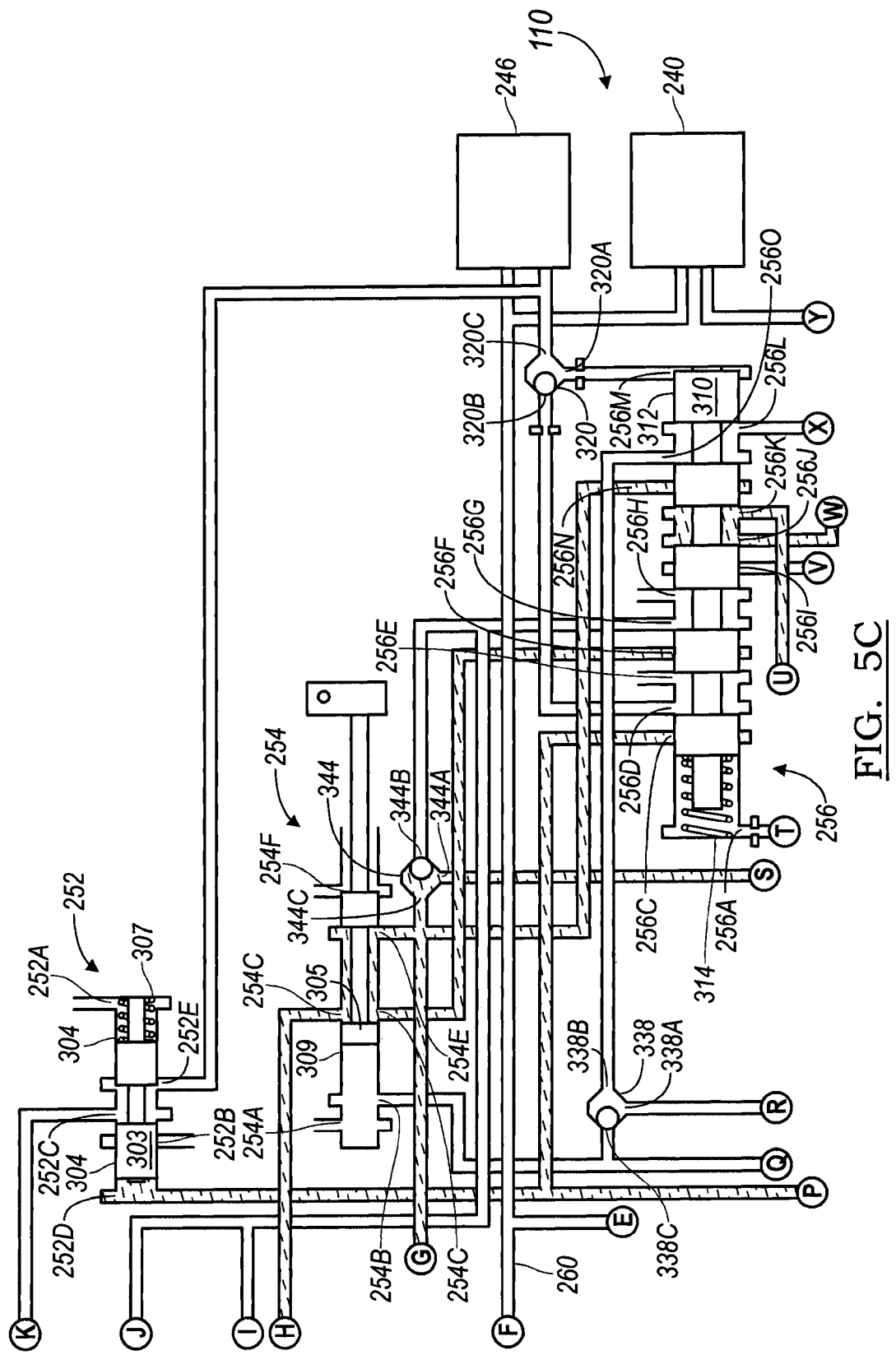
Figure 5D:
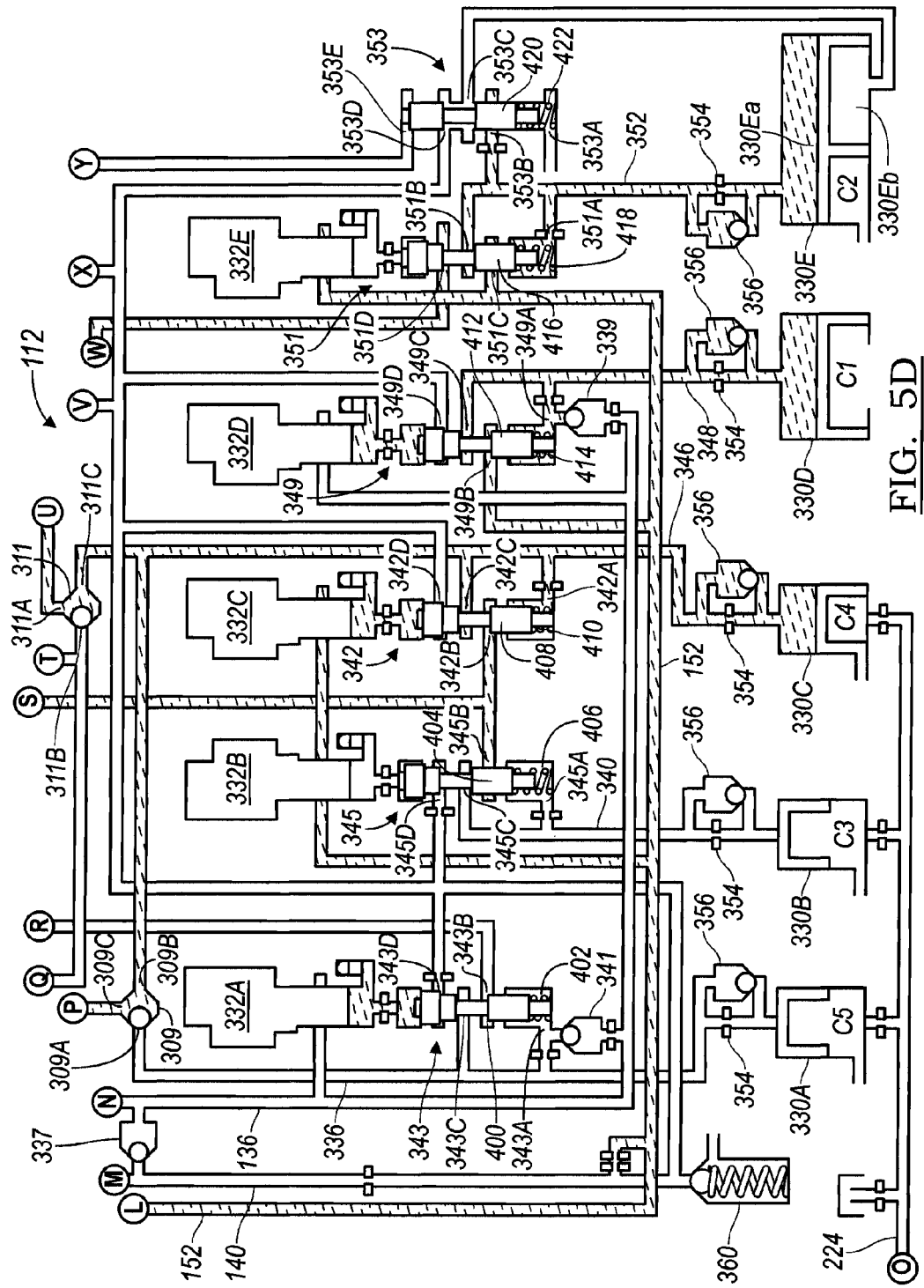

Turning now to FIGS. 5A-D, the hydraulic control system 100 is shown in a first drive mode. Here, through port 252D, the enabler valve assembly 252 communicates with the valve assembly 342 through ports 342A and 342C and with port 256C of the default mode valve assembly 256. Port 254C of the manual valve assembly 254 communicates with the default mode valve assembly 256 through port 256F, with the solenoids 332C and 332E, and with the valve assembly 349 through port 349B and the valve assembly 351 through port 351C. Port 256J communicates with port 351D of the valve assembly 351, and port 256K communicates with ports 342A and 342C of the valve assembly 342. The manual valve assembly 254 also communicates through 254E with the default mode valve assembly 256 through port 256N and with the valve assemblies 345 and 342 through ports 345B and 342B, respectively. Accordingly, the valve assembly 342 engages the clutch actuator 330C, the valve assembly 349 engages the clutch actuator 330D, and the valve assembly 351 engages the clutch actuator 330Ea.

Figure 6A:
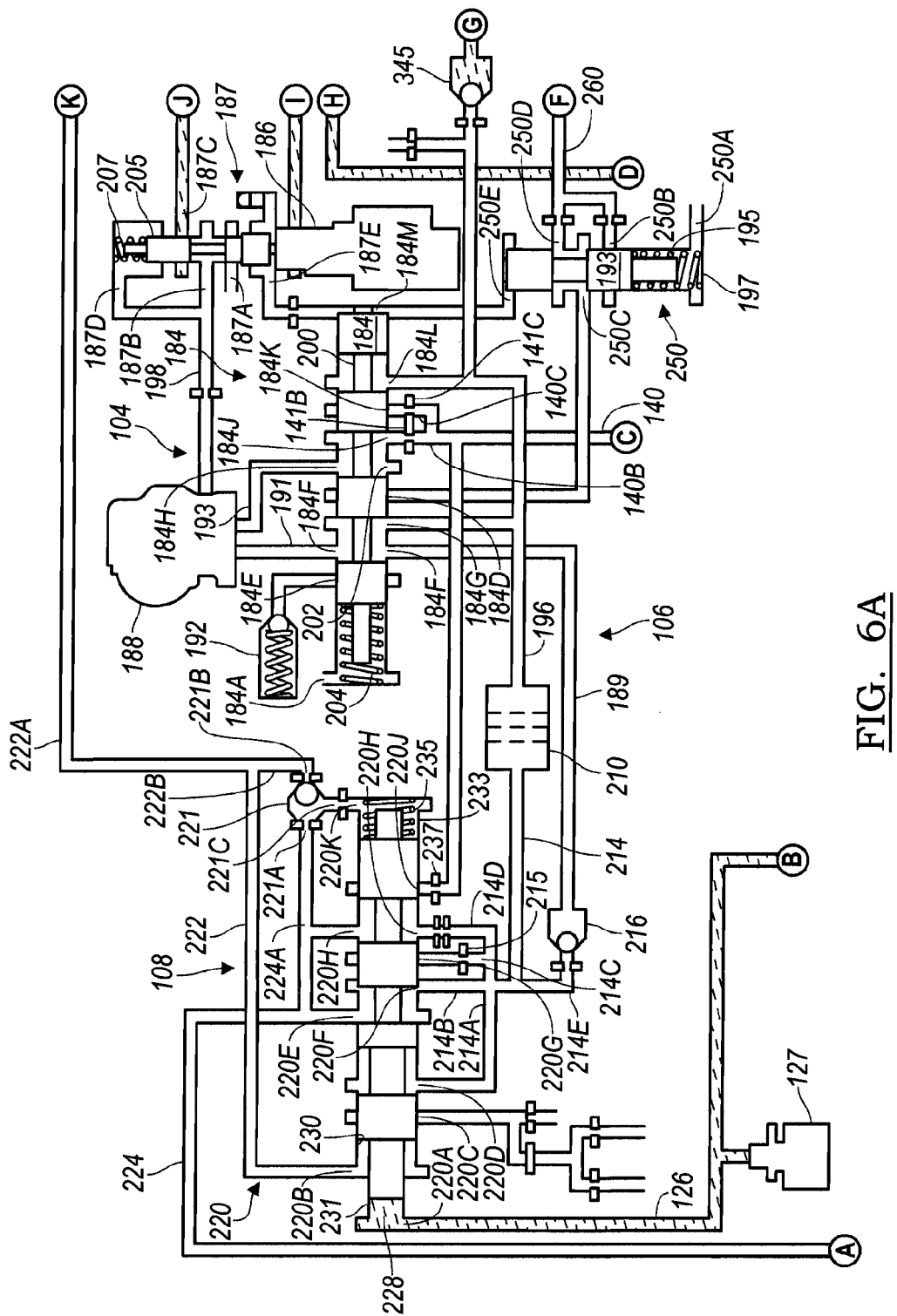
FIGS. 6A-6D is a diagram of the hydraulic control system in a fifth state in accordance with the principles of the present invention.
Figure 6B:
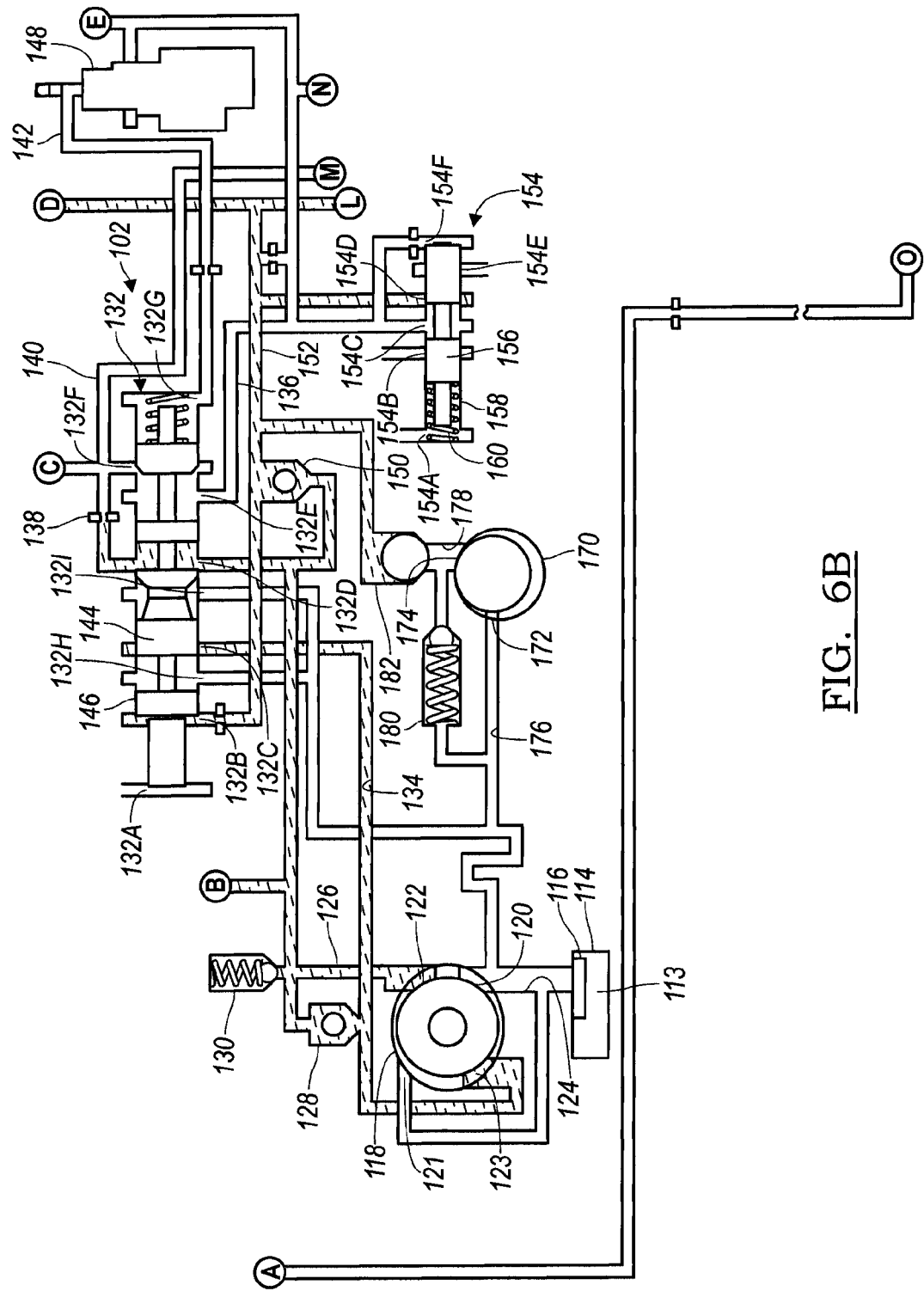
Figure 6C:
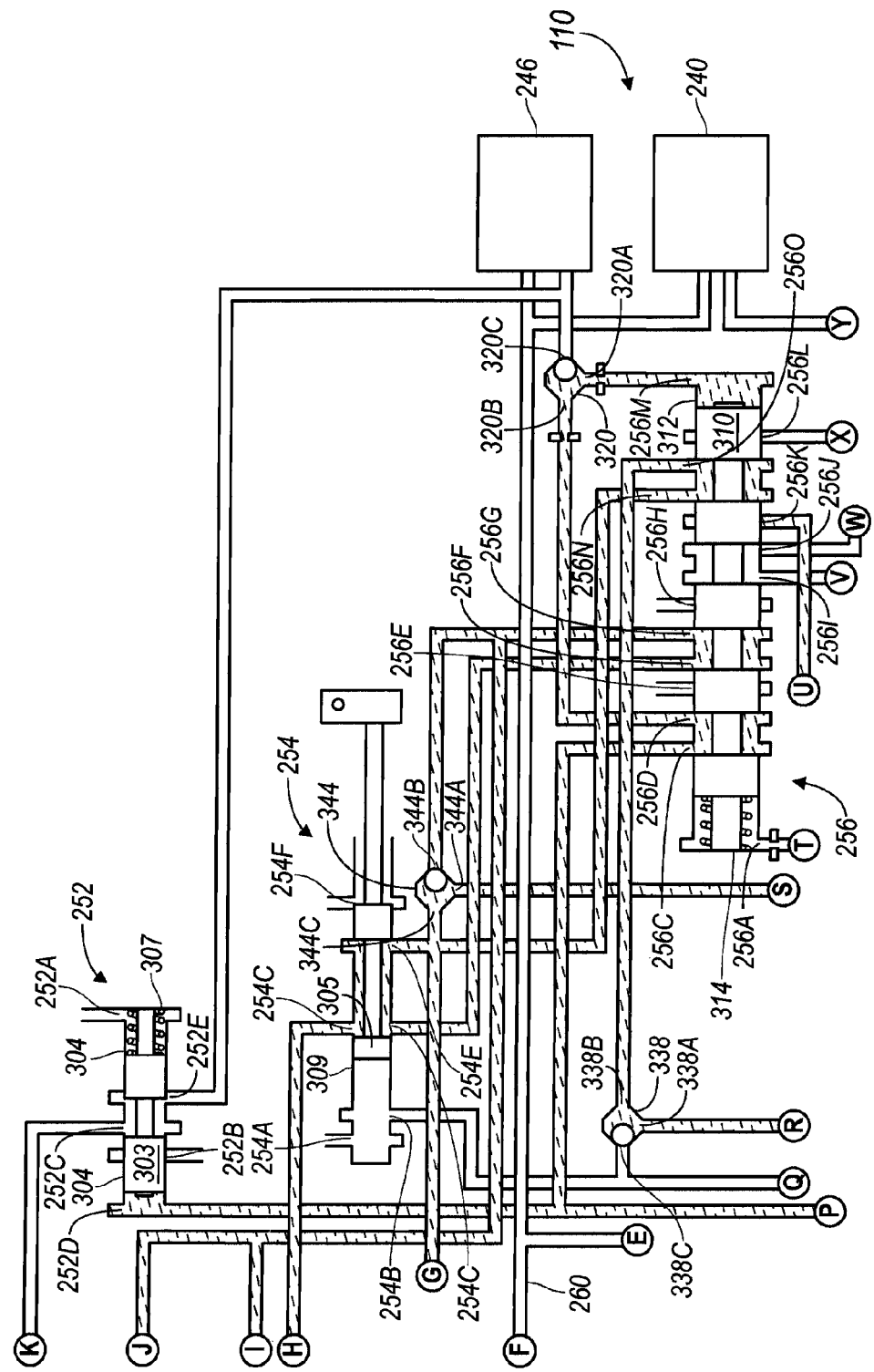
Figure 6D:
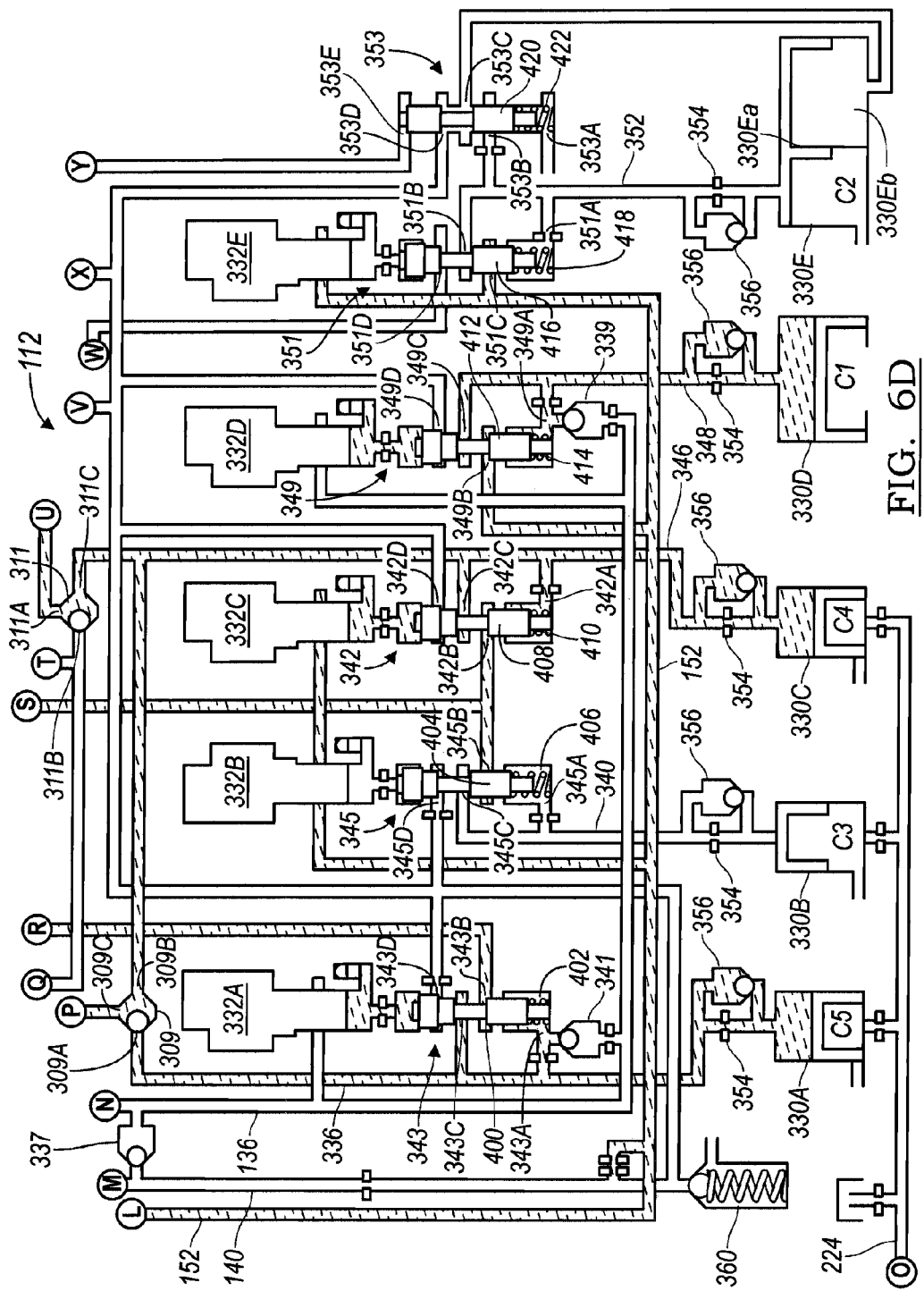

In FIGS. 6A-D, the hydraulic control system 100 is shown in a second drive mode. In this configuration, the enabler valve assembly 252 communicates through port 252D with the valve assembly 342 through ports 342A and 342C and with port 256C of the default mode valve assembly 256. Port 254C of the manual valve assembly 254 communicates with the default mode valve assembly 256 through port 256F, with the solenoids 332C and 332E, and with the valve assembly 349 through port 349B and the valve assembly 351 through port 351C. The manual valve assembly 254 also communicates through 254E with the default mode valve assembly 256 through port 256N and with the valve assemblies 345 and 342 through ports 345B and 342B, respectively. Port 256K of the default mode valve assembly 256 communicates with ports 342A and 342C of the valve assembly 342. Port 256G communicates with the valve assembly 187 through port 187C and the solenoid 186. Moreover, port 256D of the default mode valve assembly 256 communicates with port 256M, port 256O communicates with the valve assembly 343 through port 343B. As such, the valve assembly 342 engages the actuator 330C, the valve assembly 349 engages the clutch actuator 330D, and the valve assembly 343 activates the clutch actuator 330A.

The description of the invention is merely exemplary in nature and variations that do not depart from the general essence of the invention are intended to be within the scope of the invention. Such variations are not to be regarded as a departure from the spirit and scope of the invention.

What is claimed is:

1. A hydraulic control system for a transmission, the hydraulic control system comprising:
   a pressure regulator subsystem with a source of pressurized hydraulic fluid for providing a flow of hydraulic fluid;
   a transmission range selection control subsystem including a set of four valve assemblies actuated by a pair of solenoids; and
   a clutch control subsystem that provides pressurized hydraulic fluid to a plurality of clutch actuators activated by a plurality of variable force solenoids through a plurality of valve assemblies,
   wherein the plurality of valve assemblies of the clutch control subsystem are in fluid communication with the transmission range selection control subsystem and wherein the transmission range selection control subsystem employs the pressurized hydraulic fluid to engage a range selection through the clutch control subsystem.

2. The hydraulic control system of claim 1 wherein the source of pressurized hydraulic fluid is a pump.

3. The hydraulic control system of claim 1 wherein the set of four valve assemblies of the transmission range selection control subsystem includes a convertor fault valve assembly, an enabler valve assembly, a manual valve assembly, and a default mode valve assembly.

4. The hydraulic control system of claim 3 wherein each of the convertor fault valve assembly, enabler valve assembly, and the default mode valve assembly includes a spring and a valve slidably disposed in a bore, each of the convertor fault valve assembly, enabler valve assembly, and the default mode valve assembly being actuated by its respective spring and the pair of solenoids.

5. The hydraulic control system of claim 1 wherein each of the plurality of valve assemblies of the clutch control subsystem includes a spring and a valve slidably disposed in a bore.

6. The hydraulic control system of claim 5 wherein one of the plurality of valve assemblies of the clutch control subsystem is actuated by its respective spring and the pair of solenoids.

7. The hydraulic control system of claim 6 wherein each of the other valve assemblies of the plurality of valve assemblies is actuated by its respective spring and a respective solenoid of the plurality of variable force solenoids.

8. The hydraulic control system of claim 7 wherein the other valve assemblies of the plurality of valve assemblies includes five valve assemblies.

9. The hydraulic control system of claim 1 wherein the plurality of clutch actuators includes five clutch actuators.

10. The hydraulic control system of claim 1 wherein the clutch control subsystem includes at least one one-way check valve associated with one of the plurality of valve assemblies.

11. The hydraulic control system of claim 10 wherein the transmission range selection control subsystem includes a default mode valve assembly and wherein the one-way check valve communicates with the default mode valve assembly of the transmission range selection control subsystem.

12. The hydraulic control system of claim 11 wherein the clutch control subsystem includes a second one-way check valve associated with two other valve assemblies of the plurality of valve assemblies, the second one-way check valve being in communication with the default mode valve assembly.

13. A hydraulic control system for a transmission, the hydraulic control system comprising:

a pressure regulator subsystem with a source of pressurized hydraulic fluid for providing a flow of hydraulic fluid;

a cooler control flow subsystem that cools the hydraulic fluid;

a lubrication control subsystem that regulates lubrication fluid pressure as a function of the pressure of the hydraulic fluid;

a torque convertor control subsystem that modulates pressure to a torque convertor clutch;

a transmission range selection control subsystem including a set of four valve assemblies actuated by a boost solenoid and a default solenoid; and a clutch control subsystem that provides pressurized hydraulic fluid to a plurality of clutch actuators activated by a plurality of variable force solenoids through a plurality of valve assemblies, wherein the plurality of valve assemblies of the clutch control subsystem are in fluid communication with the transmission range selection control subsystem and wherein the transmission range selection control subsystem employs the pressurized hydraulic fluid to engage a range selection through the clutch control subsystem.

14. The hydraulic control system of claim 13 wherein the set of four valve assemblies of the transmission range selection control subsystem includes a convertor fault valve assembly, an enabler valve assembly, a manual valve assembly, and a default mode valve assembly.

15. The hydraulic control system of claim 14 wherein each of the convertor fault valve assembly, the enabler valve assembly, and the default mode valve assembly includes a spring and a valve slidably disposed in a bore, each of the convertor fault valve assembly, enabler valve assembly, and the default mode valve assembly being actuated by its respective spring and the boost and default solenoids.

16. The hydraulic control system of claim 15 wherein the clutch control subsystem includes a first one way check valve associated with one of the plurality of valve assemblies and a second one-way check valve associated with two other valve assemblies of the plurality of valve assemblies, the first one-way check valve and the second one-way check valve being in communication with the default mode valve assembly.

* * * * *